United States Patent
Yao et al.

(10) Patent No.: US 10,296,582 B2
(45) Date of Patent: May 21, 2019

(54) METHOD AND APPARATUS FOR DETERMINING MORPHEME IMPORTANCE ANALYSIS MODEL

(71) Applicant: TENCENT TECHNOLOGY (SHENZHEN) COMPANY LIMITED, Shenzhen (CN)

(72) Inventors: Lingling Yao, Shenzhen (CN); Qi He, Shenzhen (CN); Nan He, Shenzhen (CN); Bo Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1 day.

(21) Appl. No.: 15/109,395

(22) PCT Filed: Feb. 15, 2015

(86) PCT No.: PCT/CN2015/073105
§ 371 (c)(1),
(2) Date: Jun. 30, 2016

(87) PCT Pub. No.: WO2015/124096
PCT Pub. Date: Aug. 27, 2015

(65) Prior Publication Data
US 2016/0328380 A1    Nov. 10, 2016

(30) Foreign Application Priority Data

Feb. 22, 2014  (CN) .......................... 2014 1 0063194

(51) Int. Cl.
*G06F 17/20* (2006.01)
*G06F 17/27* (2006.01)
(Continued)

(52) U.S. Cl.
CPC ...... *G06F 17/2755* (2013.01); *G06F 17/2785* (2013.01); *G06F 17/30663* (2013.01);
(Continued)

(58) Field of Classification Search
CPC ............. G06F 17/20; G06F 17/212229; G06F 17/2247; G06F 17/27; G06F 17/2705;
(Continued)

(56) References Cited

U.S. PATENT DOCUMENTS 8,078,617 B1 * 12/2011 Neveitt ............. G06F 17/30699
707/732
8,602,793 B1 * 12/2013 Sniedzins ................ G09B 5/00
434/322
(Continued)

FOREIGN PATENT DOCUMENTS

CN    1588357 A    3/2005
CN    1809830 A    7/2006
(Continued)

OTHER PUBLICATIONS

The World Intellectual Property Organization (WIPO) International Search Report for PCT/CN2015/073105 dated Apr. 22, 2015 p. 1-3.
(Continued)

*Primary Examiner* — Qi Han
(74) *Attorney, Agent, or Firm* — Anova Law Group, PLLC

(57) ABSTRACT

A method and an apparatus for determining a morpheme importance analysis model is provided, which belongs to the field of computers. The method includes: acquiring at least two pieces of training data, each piece of training data including a query, any morpheme in the query, and an importance score of the any morpheme in the query; determining a feature value of each preset feature of each piece of training data; and determining a model parameter accord-
(Continued)

ing to the feature value of each preset feature of all training data and importance scores of morphemes included in all training data, and determining a morpheme importance analysis model according to the determined model parameter.

26 Claims, 4 Drawing Sheets

(51) Int. Cl.
  *G06F 17/30* (2006.01)
  *G06N 7/00* (2006.01)
  *G06N 99/00* (2019.01)
(52) U.S. Cl.
  CPC ....... *G06F 17/30864* (2013.01); *G06N 7/005* (2013.01); *G06N 99/005* (2013.01)
(58) Field of Classification Search
  CPC ............... G06F 17/2755; G06F 17/277; G06F 17/2775; G06F 17/2795; G06F 17/30; G06F 17/21; G06F 17/2229
  USPC ...................... 704/243, 255, 1, 2, 4, 5, 8, 10
  See application file for complete search history.

(56) References Cited

U.S. PATENT DOCUMENTS

| | | | | |
|---|---|---|---|---|
| 2003/0078683 | A1* | 4/2003 | Hartman | G06K 9/6256 700/44 |
| 2008/0010226 | A1* | 1/2008 | Brinker | G06K 9/6284 706/12 |
| 2008/0069437 | A1* | 3/2008 | Baker | G06K 9/6256 382/159 |

FOREIGN PATENT DOCUMENTS

| | | |
|---|---|---|
| CN | 101075251 A | 11/2007 |
| CN | 101271450 A | 9/2008 |
| CN | 101315624 A | 12/2008 |
| CN | 101751425 A | 6/2010 |

OTHER PUBLICATIONS

The State Intellectual Property Office of the People's Republic of China (SIPO) Office Action 1 for 201410063194.X dated Mar. 27, 2019 7 Pages. (including translation).

\* cited by examiner

METHOD AND APPARATUS FOR DETERMINING MORPHEME IMPORTANCE ANALYSIS MODEL

CROSS REFERENCE TO RELATED APPLICATIONS

This application is a national stage application of PCT application PCT/CN2015/073105, filed on Feb. 15, 2015, which claims the priority benefit of Chinese Patent Application No. 201410063194X, entitled "METHOD AND APPARATUS FOR DETERMINING MORPHEME IMPORTANCE ANALYSIS MODEL", filed on Feb. 22, 2014, the content of both of which is incorporated by reference herein in its entirety for all purposes.

FIELD OF THE TECHNOLOGY

The present disclosure relates to the field of computers and, in particular, to a method and an apparatus for determining a morpheme importance analysis model.

BACKGROUND OF THE DISCLOSURE

In the field of information retrieval, usually, a user may input a certain query in a search engine to acquire information related to the input query from the Internet. To clearly understand a retrieval intention of the user, after acquiring the query inputted by the user, the search engine may usually segment the query inputted by the user, and after obtaining respective morphemes included in the query, analyzes importance of any morpheme in the query in the query, so as to provide, according to the importance of any morpheme in the query, information and services meeting real demands of the user. Moreover, it is generally necessary to achieve analysis of importance of a morpheme in a query by using a corresponding morpheme importance analysis model, and therefore it is necessary to propose a method for determining a morpheme importance analysis model.

SUMMARY

Embodiments of the present invention provide a method and an apparatus for determining a morpheme importance analysis model. The technical solution is as follows:

In one aspect, a method for determining a morpheme importance analysis model is provided, the method including: at a computing device having one or more processors and memory storing programs executed by the one or more processors: acquiring at least two pieces of training data, each piece of training data including a query, any morpheme in the query, and an importance score of the any morpheme in the query; determining a feature value of each preset feature of each piece of training data, the preset feature at least including one of a morpheme self-explanation feature and a morpheme cross feature; and determining a model parameter according to the feature value of each preset feature of all training data and importance scores of morphemes included in all training data, and determining a morpheme importance analysis model according to the determined model parameter, where the number of the model parameters depends on the number of the preset features, and the number of the model parameters is not greater than the number of pieces of the training data.

In another aspect, an apparatus for determining a morpheme importance analysis model, including a plurality of program modules having computer-implemented instructions stored in memory of a computing device and executed by one or more processors of a computing device, the plurality program modules including: an acquisition module, configured to acquire at least two pieces of training data, each piece of training data including a query, any morpheme in the query, and an importance score of the any morpheme in the query; a first determination module, configured to determine a feature value of each preset feature of each piece of training data, the preset feature at least including one of a morpheme self-explanation feature and a morpheme cross feature; a second determination module, configured to determine a model parameter according to the feature value of each preset feature of all training data and importance scores of morphemes included in all training data, where the number of the model parameters depends on the number of the preset features, and the number of the model parameters is not greater than the number of pieces of the training data; and a third determination module, configured to determine a morpheme importance analysis model according to the determined model parameter.

When a model parameter is determined according to acquired training data, a morpheme importance analysis model is determined according to the determined model parameter, and further analysis of morpheme importance is achieved by using the morpheme importance analysis model, not only a computing speed becomes higher and efficiency of analyzing morpheme importance is improved, but also accuracy becomes higher.

BRIEF DESCRIPTION OF THE DRAWINGS

To describe the technical solutions in the embodiments of the present invention more clearly, the accompanying drawings required for describing the embodiments are introduced briefly below. Apparently, the accompanying drawings in the following description are only some embodiments of the present invention, and persons of ordinary skill in the art can obtain other accompanying drawings according to the accompanying drawings without any creative efforts.

DESCRIPTION OF EMBODIMENTS

Figure 1:
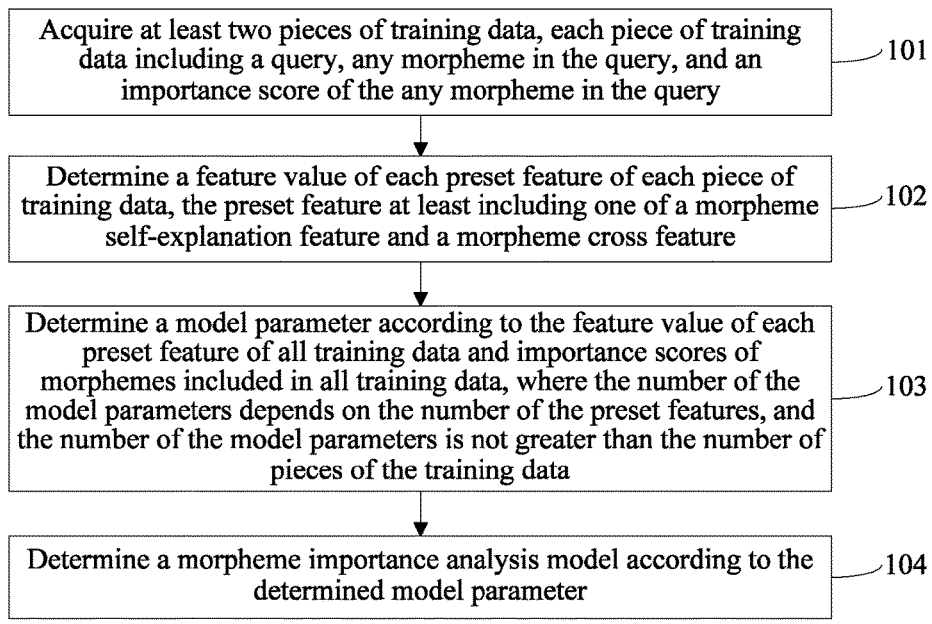
FIG. 1 is a flowchart of a method for determining a morpheme importance analysis model according to some embodiments of the present disclosure.

To make the objectives, technical solutions, and advantages of the present disclosure clearer, the implementation manners of the present invention are further described below in detail with reference to the accompanying drawings.

During determination of a morpheme importance analysis model in related technologies, the following method is generally adopted: extracting some queries and morphemes after word segmentation of the queries, determining importance of the morphemes in the queries by using a manual annotation method, and taking an importance score of each morpheme as a criterion of evaluating importance of the morphemes in the queries; and taking several queries obtained through manual annotation, a certain morpheme in the queries, and an importance score of the morpheme in the queries as acquired training data, and training a decision tree model by using the acquired training data, so as to take a model obtained through training as the determined morpheme importance analysis model.

As in the related technologies, a decision tree model is usually established to analyze importance of a morpheme and as a decision tree model has many hierarchical structures and a low computing speed. When a determined decision tree model is used to analyze importance of a morpheme, analysis speed is low, resulting in low efficiency of analyzing importance of a morpheme in a query. In addition, as it is difficult to make accurate prediction on continuous fields in a decision tree model, accuracy is not high when importance of a morpheme in a query is analyzed by using the determined decision tree model.

In the fields of text mining and retrieval, after a query is segmented to obtain respective morphemes, it is usually necessary to analyze importance degrees of the morphemes in the query. For example, during text retrieval, after a user inputs a query in a search engine, the most important morpheme in the query can be determined by analyzing importance of respective morphemes in the query, and the most important morpheme is selected for priority retrieval, so as to provide information and services meeting real demands of the user. For example, if a query T is given, a word segmentation result obtained by segmenting the query is $T=t_1t_2t_3t_4 \ldots t_n$, where n is the number of morphemes after word segmentation, and $t_i$ denotes a specific morpheme in the query. For each morpheme $t_i$, a corresponding importance score $w_i$ can be used to denote an importance degree of each morpheme $t_i$ in the query T, $w_i \in [0,1]$, and when $w_i$ is greater, the importance degree of the morpheme $t_i$ in the query T is higher. Therefore, after the most important morpheme in the query is obtained through analysis, the user can be provided, according to the most important morpheme, with information and services related to the most important morpheme.

During actual applications, in determination of importance degrees of respective morphemes in a query, it is generally common to predetermine a model for analyzing importance of the morphemes in the query, and the importance of the morphemes in the query is analyzed by using the determined model. The embodiments of the present invention provide a morpheme importance analysis model for determining importance of morphemes in a query. The importance of morphemes in the query can be analyzed by using the determined model, so as to determine the most importance morpheme in the query.

Please refer to Embodiment 1 and Embodiment 2 in the following for details of the specific method for determining a morpheme importance analysis model:

Embodiment 1

In combination with the foregoing content, the embodiment of the present invention provides a method for determining a morpheme importance analysis model. Referring to FIG. 1, the procedure of the method according to the embodiment of the present invention includes:

Step 101: Acquiring at least two pieces of training data, each piece of training data including a query, any morpheme in the query, and an importance score of the morpheme in the query.

In one embodiment, the acquiring at least two pieces of training data includes: acquiring at least one query from historical query data, the historical query data being at least one piece of historical data in a retrieval log, a historical extension relation vocabulary, and a click log; acquiring at least one morpheme in the query, and determining an importance score of each morpheme in the query; and determining at least two pieces of training data according to the acquired query, morphemes in each query, and the importance scores of the morphemes in the query.

In one embodiment, the historical query data is the historical data in the retrieval log; and the determining an importance score of each morpheme in the query includes: obtaining all morphemes in the query, and respectively counting the number of times each morpheme appears and the total number of times all morphemes in the query appear; and determining the importance score of each morpheme in the query according to the number of times each morpheme appears and the total number of times all morphemes in the query appear.

In one embodiment, the historical query data is the historical data in the historical extension relation vocabulary, the historical data including a query and relational words corresponding to the query; and the determining an importance score of each morpheme in the query including: obtaining all morphemes in the query, and respectively counting the number of times each morpheme appears and the total number of relational words including each morpheme in the relational words corresponding to the query; and determining the importance score of each morpheme in the query according to the number of times each morpheme appears and the total number of the relational words including each morpheme in the relational words corresponding to the query.

In one embodiment, the historical query data is the historical data in the click log, the historical data including a query-click term composed of a query and a click term corresponding to the query; and the determining an importance score of each morpheme in the query includes: counting the number of presentations and the number of clicks of a query-click term having common morphemes, and counting the number of accumulative presentations and the number of accumulative clicks corresponding to each common morpheme; and determining the number of presentations and the number of clicks corresponding to each morpheme in the query according to the number of accumulative presentations and the number of accumulative clicks corresponding to each common morpheme, and determining the importance score of each morpheme in the query according to the number of presentations and the number of clicks corresponding to each morpheme in the query.

Step 102: Determining a feature value of each preset feature of each piece of training data, the preset feature at least including one of a morpheme self-explanation feature and a morpheme cross feature.

In one embodiment, the morpheme self-explanation feature at least includes one of a morpheme proper noun type feature, a morpheme inverse document frequency (IDF) feature, a morpheme word segmentation feature, a position feature of a morpheme in a query, and a global core score feature of a morpheme; and the morpheme cross feature at least includes one of a literal cross feature between a morpheme and another morpheme in a query of the morpheme, an average value feature of a morpheme transition probability in a query, a first transition probability feature of a morpheme and a second transition probability feature of the morpheme, a text classification related feature of a morpheme, a first cross feature between subject distribution of a morpheme and subject distribution of a query of the morpheme, and a probabilistic latent semantic analysis (PLSA) subject similarity feature.

In one embodiment, when the preset feature includes the average value feature of a morpheme transition probability in a query in the morpheme cross feature, the determining a feature value of each preset feature of each piece of training data includes: acquiring transition probabilities between a morpheme in each piece of training data and other morphemes in a query of the morpheme in each piece of training data according to a transition probability dictionary; and determining an average value of the transition probabilities between a morpheme in each piece of training data and other morphemes in a query of the morpheme in each piece of training data, and determining the average value of the transition probabilities as a feature value of the average value feature of a morpheme transition probability in a query.

In one embodiment, when the preset feature includes the first transition probability feature of the morpheme and the second transition probability feature of the morpheme in the morpheme cross feature, the determining a feature value of each preset feature of each piece of training data includes: querying a transition probability dictionary for a probability value of a first transition probability of a morpheme in each piece of training data and a probability value of a second transition probability of the morpheme, and respectively determining the probability value of the first transition probability and the probability value of the second transition probability as feature values of the first transition probability feature of the morpheme and the second transition probability feature of the morpheme.

In one embodiment, the method further includes: outputting queries included in a retrieval session in pairs, to obtain multiple query pairs, where each query pair obtained includes a first query and a second query; segmenting first queries and second queries in all query pairs included in the retrieval session, and combining each morpheme in the first queries with each morpheme in the second queries to obtain a morpheme pair, each morpheme pair including a first morpheme in the first queries and a second morpheme in the second queries; counting the number of times any morpheme pair appears in the retrieval session and the number of times the first morpheme and the second morpheme in the any morpheme pair separately appear; determining a transition probability of the first morpheme relative to the second morpheme in the any morpheme pair according to the number of times any morpheme pair appears in the retrieval session and the number of times the second morpheme in the any morpheme pair separately appears, and determining a transition probability of the second morpheme relative to the first morpheme according to the number of times any morpheme pair appears in the retrieval session and the number of times the first morpheme in the any morpheme pair separately appears; and obtaining the transition probability dictionary according to transition probabilities of first morphemes relative to second morphemes and transition probabilities of the second morphemes relative to the first morphemes in all morpheme pairs.

In one embodiment, when the preset feature includes the text classification related feature of a morpheme in the morpheme cross feature and the text classification related feature of a morpheme includes related features between morphemes and each morpheme category in a morpheme classification library, the determining a feature value of each preset feature of each piece of training data includes: acquiring a first preset number of morpheme categories in the morpheme classification library of the morpheme in each piece of training data, determining a feature value of a related feature between the morpheme in each piece of training data and the first preset number of morpheme categories as a first feature value, and determining a feature value of a related feature between the morpheme in each piece of training data and other morpheme categories in the morpheme classification library except the first preset number of morpheme categories as a second feature value.

In one embodiment, when the text classification related feature of a morpheme further includes related features between the morphemes and each query category in a query classification library, the determining a feature value of each preset feature of each piece of training data further includes: acquiring a second preset number of query categories in the query classification library of the query of the morpheme in each piece of training data, determining a feature value of a related feature between the morpheme in each piece of training data and the second preset number of query categories as a third feature value, and determining a feature value of a related feature between the morpheme in each piece of training data and other query categories in the query classification library except the second preset number of query categories as a fourth feature value.

In one embodiment, when the text classification related feature of a morpheme further includes a second cross feature between a morpheme category of a morpheme and a query category of a query of the morpheme, the determining a feature value of each preset feature of each piece of training data further includes: determining each sub morpheme category under the first preset number of morpheme categories in the morpheme classification library of the morpheme in each piece of training data, and determining each sub query category under the second preset number of query categories in the query classification library of the query of the morpheme in each piece of training data; and constructing a second cross feature with each sub morpheme category and each sub query category, if the sub morpheme category and the sub query category in any second cross feature are the same, determining a feature value of the any second cross feature as a fifth feature value, or if the sub morpheme category and the sub query category in the any second cross feature are different, determining a feature value of the any second cross feature as a sixth feature value.

In one embodiment, when the preset feature includes the first cross feature between subject distribution of a morpheme and subject distribution of a query of the morpheme in the morpheme cross feature, the determining a feature value of each preset feature of each piece of training data includes: acquiring subject distribution of a third preset number of morphemes in a morpheme subject library of the morpheme in each piece of training data, and acquiring subject distribution of a fourth preset number of queries in a query subject library of a query of the morpheme in each piece of training data; determining subject distribution of each sub morpheme under subject distribution of the third preset number of morphemes in a morpheme subject library of the morpheme in each piece of training data, and determining subject distribution of each sub query under subject distribution of the fourth preset number of queries in the query subject library of the query of the morpheme in each piece of training data; and constructing one first cross feature with subject distribution of each sub morpheme and subject distribution of each sub query, if subject distribution of the sub morpheme and subject distribution of the sub query in any first cross feature are the same, determining a feature value of the any first cross feature as a seventh feature value, and if subject distribution of the sub morpheme and subject distribution of the sub query in the any first cross feature are different, determining the feature value of the any first cross feature as an eighth feature value.

In one embodiment, when the preset feature includes the PLSA subject similarity feature in the morpheme cross feature, the determining a feature value of each preset feature of each piece of training data includes: acquiring subject distribution of a third preset number of morphemes in a morpheme subject library of the morpheme in each piece of training data, and acquiring subject distribution of a fourth preset number of queries in a query subject library of a query of the morpheme in each piece of training data; and calculating a subject similarity value between subject distribution of each morpheme and subject distribution of each query, and determining each subject similarity value obtained through calculation as a feature value of the PLSA subject similarity feature.

Step 103: Determining a model parameter according to the feature value of each preset feature of all training data and importance scores of morphemes included in all training data, where the number of the model parameters depends on the number of the preset features, and the number of the model parameters is not greater than the number of pieces of the training data.

Step 104: Determining a morpheme importance analysis model according to the determined model parameter.

In the method according to the embodiment of the present invention, when a model parameter is determined according to acquired training data, a morpheme importance analysis model is determined according to the determined model parameter, and further analysis of morpheme importance is achieved by using the morpheme importance analysis model, not only a computing speed becomes higher and efficiency of analyzing morpheme importance is improved, but also accuracy becomes higher.

Embodiment 2

Figure 2:
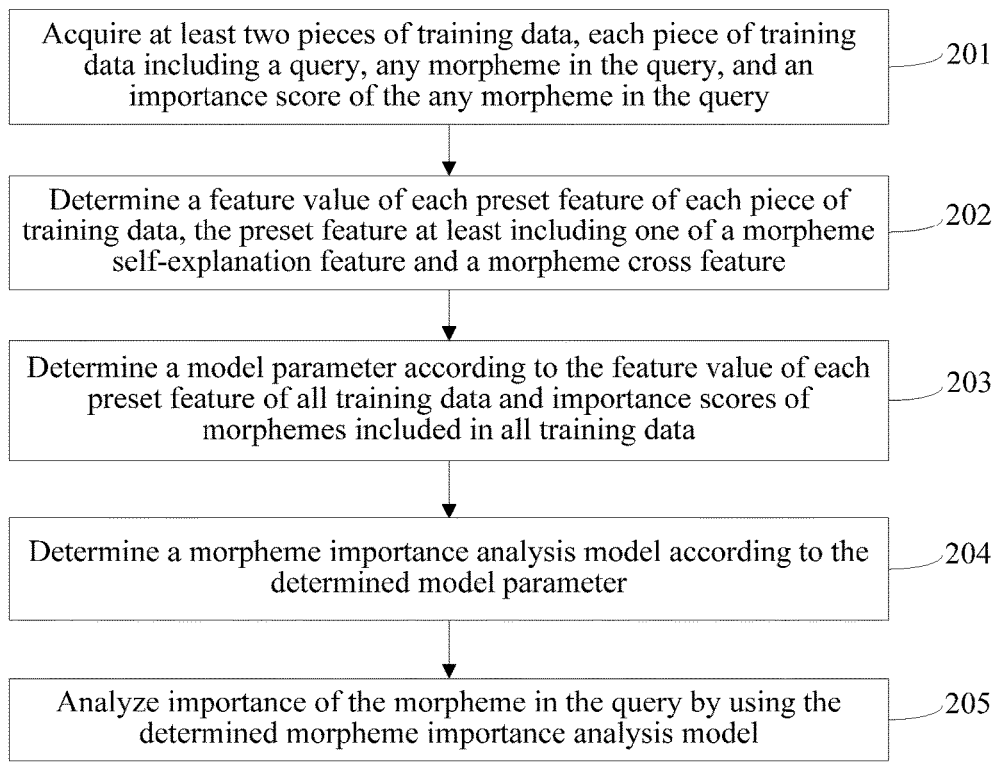
FIG. 2 is a flowchart of a method for determining a morpheme importance analysis model according to some embodiments of the present disclosure.

In combination with the content of Some embodiments, the embodiment of the present invention provides a method for determining a morpheme importance analysis model. Referring to FIG. 2, the procedure of the method according to the embodiment of the present invention includes:

Step 201: Acquiring at least two pieces of training data, each piece of training data including a query, any morpheme in the query, and an importance score of the any morpheme in the query.

In the method according to the embodiment of the present invention, a morpheme importance analysis model can be determined by training a preset model. In order to train the preset model to obtain the morpheme importance analysis model, it is necessary to acquire a large amount of training data and train the preset model by using the training data. There may be many kinds of specific content for the preset model, for example, the preset model may be a logical regression model. Certainly, the preset model may also be another model, which is not specifically limited in the embodiment of the present invention. In addition, during training of the preset model, as the number of pieces of the training data is closely related to characteristics of a model parameter of the preset model, to determine the morpheme importance analysis model by determining the model parameter in the following, at least two pieces of training data can be acquired in combination with the characteristics of the model parameter of the preset model.

When the preset model is trained to obtain the morpheme importance analysis model, it is necessary to use a query, any morpheme in the query, and an importance score of the any morpheme in the query. Therefore, each piece of training data at least includes a query, any morpheme in the query, and an importance score of the any morpheme in the query.

The embodiment of the present invention does not specifically limit the manner of acquiring at least two pieces of training data. During specific implementation, the acquiring at least two pieces of training data includes, but is not limited to, the following steps:

Step 1: Acquiring at Least One Query from Historical Query Data.

The embodiment of the present invention does not limit specific content of the historical query data, and the historical query data includes, but is not limited to, at least one piece of historical data in a retrieval log, a historical extension relation vocabulary, and a click log. In addition, there may be many manners of acquiring at least one query from the historical query data. During specific implementation, at least one piece of query data may be selected from the historical query data as the acquired query. The embodiment of the present invention does not limit the manner of acquiring the historical query data; during specific implementation, the historical query data can be automatically mined from a search log.

Step 2: Acquiring at Least One Morpheme in the Query, and Determine an Importance Score of Each Morpheme in the Query.

To conveniently use the acquired training data to train the preset model to determine the model parameter in the preset model, it is necessary to determine at least one morpheme in the query and determine an importance score of each morpheme in the query. The manner of determining at least one morpheme in the query can be, after acquisition of at least one query, segmenting the acquired query to obtain a morpheme. There may be many manners of segmenting the acquired query. During specific implementation, a character string sequence making up a query can be segmented into separate morphemes by using a computer program. For example, if the query is "YuZaiChangjiangZhongYou (鱼在长江中游, literally "fish swims in the Yangtze River")", to separate morphemes by using a symbol "/", a word segmentation result obtained by segmenting the query is "Yu/Zai/Changjiang/Zhong/You (鱼/在/长江/中/游, "fish/in/Yangtze River/in/swim")".

The embodiment of the present invention does not specifically limit the manner of determining an importance score of each morpheme in the query. During specific implementation, the importance score of each morpheme in the query can be determined by adopting a different manner according to the type of the historical query data. Please refer to the content described below for details:

A: When the historical query data is the historical data in the retrieval log, the manner of determining an importance score of each morpheme in the query includes, but is not limited to:

(1) Obtaining all morphemes in the query, and respectively counting the number of times each morpheme appears and the total number of times all morphemes in the query appear.

When the number of times each morpheme appears and the total number of times all morphemes in the query appear are counted separately, the count can be done by using a retrieval session as a unit. The retrieval session can be obtained according to division of a user id, retrieval time, and text relevance between queries. In the embodiment of the present invention, a continuous retrieval sequence retrieved by a same user within half an hour and with text relevance between queries greater than a certain threshold can be taken as a retrieval session. For example, if a same user inputs the following queries in the search engine within half an hour: "DuoChiTudouKeyiZhanggaoMa (多吃土豆可以长高吗, literally "Can I grow taller by eating more potatoes")", "ZenyangCaiNengZhanggaoNe (怎样才能长高呢, literally "How can I grow taller")", "YundongKeyiZhanggaoMa (运动可以长高吗, literally "Can I grow taller by exercising more")", and "ZhanggaoMijue (长高秘诀, literally "the secret to grow taller")", these queries make up a continuous retrieval sequence. If a set threshold is 0.5 and text relevance between the queries obtained by calculating the text relevance between the queries is 0.8, the text relevance between the queries is determined to be greater than a certain threshold. Therefore, the continuous retrieval sequence that the queries make up can be taken as a retrieval session. Certainly, herein, that half an hour is time of a retrieval session is only taken as an example for description; during specific implementation, duration of the retrieval session may also be another time interval, which is not specifically limited in the embodiment of the present invention. In addition, the embodiment of the present invention does not specifically limit the method for calculating the text relevance between the queries.

When all morphemes in queries are obtained, each query in the retrieval session can be segmented to obtain all morphemes in the query. After all queries in the retrieval session are segmented, the number of times each morpheme appears and the total number of times all morphemes in the query appear may be counted separately.

It should be noted that, when the morphemes after word segmentation are synonyms, in the count of the number of times a certain morpheme appears, it is necessary to add the number of times the synonym of the morpheme appears to the number of times the morpheme appears. For example, if a certain retrieval session is "DuoChiTudouKeyiZhanggaoMa (多吃土豆可以长高吗, literally "Can I grow taller by eating more potatoes")", "ZenyangCaiNengZhanggaoNe (怎样才能长高呢, literally "How can I grow taller")", "YundongKeyiZhanggaoMa (运动可以长高吗, literally "Can I grow taller by exercising more")", "ZhanggaoMijue (长高秘诀, literally "the secret to grow taller")", and "ZenggaoYaoTaobao (增高药淘宝, literally "height-increasing medicine, Taobao")". In the retrieval session, " 长高 (Zhanggao, literally "Grow taller")" and " 增高 (Zenggao, literally "height-increasing")" are synonyms. Therefore, in the count of the number of times "Zhanggao" appears, " 增高 (Zenggao, literally "height-increasing")" and " 长高 (Zhanggao, literally "Grow taller")" should both be counted. There are many manners of determining whether a certain morpheme is the synonym of another morpheme; this embodiment does not specifically limit the manner, which includes, but is not limited to, loading an additional synonym dictionary.

(2) Determining the importance score of each morpheme in the query according to the number of times each morpheme appears and the total number of times all morphemes in the query appear.

After the number of times each morpheme appears and the total number of times all morphemes in the query appear are counted, the importance score of each morpheme in the query can be determined according to the number of times each morpheme appears and the total number of times all morphemes in the query of the morpheme appear. There may be many manners of determining the importance score of each morpheme in the query according to the number of times each morpheme appears and the total number of times all morphemes in the query appear. During specific implementation, the manner includes, but is not limited to, determining the importance score of each morpheme in the query according to the number of times each morpheme appears and the total number of times all morphemes in the query of the morpheme appear by using the following formula:

$$w_i = \frac{N_i}{\sum_i N_i} \quad (1)$$

In Formula (1), $w_i$ is an importance score of each morpheme in the query, $N_i$ denotes the number of times a certain morpheme $t_i$ appears in a retrieval session, and $$\sum_i N_i$$

denotes the total number of times all morphemes in the query appear in the retrieval session.

B: When the historical query data includes historical data in a historical extension relation vocabulary of a query and relational words corresponding to the query, the manner of determining an importance score of each morpheme in the query includes, but is not limited to:

(1) Obtaining all morphemes in the query, and respectively counting the number of times each morpheme appears and the total number of relational words including each morpheme in the relational words corresponding to the query.

The manner of obtaining all morphemes in the query still can be obtained by segmenting all queries in the historical extension relation vocabulary. In addition, in order to obtain an importance score of a certain morpheme, it is necessary to respectively count the number of times each morpheme in the historical extension relation vocabulary appears and the total number of relational words including each morpheme in the relational words corresponding to the query in the historical extension relation vocabulary. For example, if a query is "Shenme Kuaidi Hao (什么快递好, literally "which courier service is better")", the morpheme is "Kuaidi (快递, literally "courier service")". To obtain an importance score of "Kuaidi (快递, literally "courier service")", it is necessary to count the number of times "Kuaidi (快递, literally "courier service")" appears in the historical extension relation vocabulary and the number of relational words including "Kuaidi (快递, literally "courier service")" in the historical extension relation vocabulary.

In addition, there may be many manners of acquiring the historical extension relation vocabulary, including, but not limited to, obtaining the historical extension relation vocabulary from found advertisement matches. For example, in the found advertisement matches, a query-bidterm extension vocabulary with high relevance may be generated for high-frequency queries every day, and through gradual accumulation, a database that describes relations between queries and bidterms is obtained. In the embodiment of the present invention, the query-bidterm extension vocabulary formed by the queries and the bidterms in the database can be determined as the historical extension relation vocabulary, and the bidterms in the database are determined as relational words corresponding to the queries.

(2) Determining the importance score of each morpheme in the query according to the number of times each morpheme appears and the total number of the relational words including each morpheme in the relational words corresponding to the query.

During specific implementation, this embodiment does not limit the manner of determining the importance score of each morpheme in the query according to the number of times each morpheme appears and the total number of the relational words including each morpheme in the relational words corresponding to the query. If a result after word segmentation of a query is $T=t_1t_2t_3t_4 \ldots t_n$, t an importance score $w_i$ of a certain morpheme $t_i$ can be obtained by using the following calculation formula:

$$w_i = \frac{M_i}{Num_{bidterms}} \qquad (2)$$

In Formula (2), $M_i$ denotes the number of times the morpheme $t_i$ appears in the historical extension relation vocabulary, and $Num_{bidterms}$ denotes, in the historical extension relation vocabulary, the total number of relational words including the morpheme in the relational words corresponding to the queries in the query-bidterm extension vocabulary. It should be noted that, if the morpheme appears more than once in a certain relational word, the number is recorded as once.

To facilitate understanding, the manner of determining an importance score of a morpheme when the historical query data is a historical extension relation vocabulary can be explained in combination with a specific example. For example, if a query is "GuangziTuomaoDeXiaoguoZenmeyang (光子脱毛的效果怎么样, literally "how well does intense pulsed light hair removal work")", the morpheme is "Tuomao (脱毛, literally "hair removal")", it is obtained through query that there are in total 38 relational words corresponding to the query in the historical extension relation vocabulary, that is, the value of $Num_{bidterms}$ is 38. In addition, "Tuomao (脱毛, literally "hair removal")" appears in all relational words, and the number of times the morpheme "Tuomao (脱毛, literally "hair removal")" appears in the historical extension relation vocabulary is 38, that is, the value of $M_i$ is 38. Therefore, an importance score of "Tuomao (脱毛, literally "hair removal")" in "GuangziTuomaoDeXiaoguoZenmeyang (光子脱毛的效果怎么样, literally "how well does intense pulsed light hair removal work")" is 38/38=1.0.

C: When the historical query data is the historical data in the click log, in combination with characteristics of the click log, the historical query data includes a query-clickterm composed of a query and a click term corresponding to the query. The embodiment of the present invention does not specifically limit specific content of the click log. For example, in search advertising, an advertiser may select a bidterm for an advertisement to place. A search advertising playback system may perform online matching on a query submitted by a user, finds bidterms with the highest relevance, and pulls, by using inverted information of the bidterms, an advertisement and presents the advertisement for the user. In this case, the user may click a corresponding advertisement according to a search intention. In the process, for each query, a series of query-bidterms related to the query may be generated, and query and bidterm generally have common morphemes. Therefore, in the embodiment of the present invention, a query-bidterm can be taken as a query-clickterm, and an importance score of each morpheme in the query is determined by counting click rates of common morphemes included in query and bidterm in the query-clickterm. As to the type of the historical query data, the manner of determining an importance score of each morpheme in the query includes, but not limited to:

(1) Counting the number of presentations and the number of clicks of a query-clickterm having common morphemes.

During specific implementation, the number of presentations and the number of clicks of all query-bidterms related to the query can be counted. As shown in Table 1, Table 1 shows count results on the number of presentations and the number of clicks of a query-clickterm having common morphemes. In Table 1, $t_i$ denotes the morpheme after word segmentation of the query, $d_i$ denotes the number of presentations of the query-bidterm, and $c_i$ denotes the number of clicks of the query-bidterm. It should be noted that, in the process of counting, if query and bidterm in the query-bidterm have no common morpheme, the query-bidterm is discarded.

TABLE 1

| query | bidterm | common morphemes in query and bidterm | the number of presentations | the number of clicks |
|---|---|---|---|---|
| $t_1t_2t_3$ | $t_2t_3t_4$ | $t_2t_3$ | $d_1$ | $c_1$ |
| $t_1t_2t_3$ | $t_1t_4t_5$ | $t_1$ | $d_2$ | $c_2$ |
| $t_1t_2t_3$ | $t_1t_3t_6$ | $t_1t_3$ | $d_3$ | $c_3$ |
| $t_1t_2t_3$ | $t_1t_3t_6$ | $t_1t_3$ | $d_4$ | $c_4$ |
| $t_1t_2t_3$ | $t_1t_7$ | $t_1$ | $d_5$ | $c_5$ |

(2) Counting the number of accumulative presentations and the number of accumulative clicks corresponding to each common morpheme.

When the number of accumulative presentations and the number of accumulative clicks corresponding to each common morpheme are counted, they can be obtained by accumulating the number of presentations and the number of clicks of the query-bidterm where query and bidterm have common morphemes in step (1). As shown in Table 2, Table 2 shows count results of the number of accumulative presentations and the number of accumulative clicks corresponding to each common morpheme obtained by accumulating the number of presentations and the number of clicks of the query-bidterm where query and bidterm have common morphemes in Table 1.

TABLE 2

| query | common morpheme | the number of presentations | the number of clicks |
|---|---|---|---|
| $t_1t_2t_3$ | $t_2t_3$ | $d_1$ | $c_1$ |
| $t_1t_2t_3$ | $t_1$ | $d_2 + d_5$ | $c_2 + c_5$ |
| $t_1t_2t_3$ | $t_1t_3$ | $d_3 + d_4$ | $c_3 + c_4$ |

(3) Determining the number of presentations and the number of clicks corresponding to each morpheme in the query according to the number of accumulative presentations and the number of accumulative clicks corresponding to each common morpheme, and determining the importance score of each morpheme in the query according to the number of presentations and the number of clicks corresponding to each morpheme in the query.

After the number of presentations and the number of clicks of query-bidterm having common morphemes are counted, the number of accumulative presentations and the number of accumulative clicks corresponding to each common morpheme can be determined according to the number of presentations and the number of clicks of query-bidterm having common morphemes, and the number of presentations and the number of clicks corresponding to each morpheme in the query are further determined. When the number of presentations and the number of clicks corresponding to each morpheme in the query are determined, the number of presentations and the number of clicks can be obtained according to the counted number of presentations and the counted number of clicks of the query-bidterm where query and bidterm have common morphemes in Table 2. During specific implementation, each common morpheme counted in Table 2 can be split to obtain each morpheme included in the common morpheme, and the number of presentations and the number of clicks of each morpheme are superimposed to obtain the number of presentations and the number of clicks corresponding to each morpheme in the query. Moreover, after the number of presentations and the number of clicks corresponding to each morpheme in the query are obtained, the click rate corresponding to each morpheme can be determined according to the number of presentations and the number of clicks corresponding to each morpheme. In the embodiment of the present invention, the determined click rate can be taken as a criterion of the importance score of the morpheme in the query. Reference can be made to Table 3 for the click rate of each morpheme obtained according to the number of presentations and the number of clicks corresponding to each morpheme in the query, and the click rates shown in Table 3 indicate importance scores of morphemes in the query.

TABLE 3

| query | single morpheme in query | click rate |
|---|---|---|
| $t_1t_2t_3$ | $t_1$ | $(c_2 + c_3 + c_4 + c_5)/(d_2 + d_3 + d_4 + d_5)$ |
| $t_1t_2t_3$ | $t_2$ | $c_1/d_1$ |
| $t_1t_2t_3$ | $t_3$ | $(c_1 + c_3 + c_4)/(d_1 + d_3 + d_4)$ |

By combining the types of three kinds of historical query data, that is, A, B and C, at least one morpheme in the query can be determined, and an importance score of the morpheme in the query is determined.

Step 3: Determining the at least two pieces of training data according to the acquired query, morphemes in each query, and the importance scores of the morphemes in the query.

As each piece of training data includes a query, any morpheme in the query, and an importance score of the any morpheme in the query, at least two pieces of training data can be determined according to the determined query, morphemes in each query, and the importance scores of the morphemes in the query.

Thus, the method according to the embodiment of the present invention provides a method for acquiring training data directly from historical query data; especially, an importance score of a morpheme in the training data is determined in combination with the type of the historical query data. However, in the prior art, during acquisition of training data, some queries and morphemes after word segmentation thereof may be extracted manually, importance of the morphemes in the queries is determined by using a manual annotation method, and several queries obtained by using manual annotation, a certain morpheme in the queries, and an importance score of the morpheme in the queries are taken as the acquired training data. Therefore, when the method for acquiring training data in the prior art is used to obtain training data, not only is the accuracy not high, but also lots of human resources will be wasted. In addition, as the number of pieces of training data manually annotated is limited, when a model is trained by using the obtained training data in the following, the model may be restricted to the number of pieces of the training data to result in low accuracy of the model. According to the method for acquiring training data provided in the embodiment of the present invention, not only the accuracy of the determined morpheme importance analysis model becomes higher, but also lots of training data can be obtained, so that the determined morpheme importance analysis model is more accurate without being restricted to the scale of the training data.

Step 202: Determine a feature value of each preset feature of each piece of training data, the preset feature at least including one of a morpheme self-explanation feature and a morpheme cross feature.

After the training data is acquired, in order to train a preset model, it is further necessary to determine a feature value of each preset feature of each piece of training data, where the preset feature includes, but not limited to, at least one of a morpheme self-explanation feature and a morpheme cross feature.

The morpheme self-explanation feature can indicate inherent natures of the morpheme itself. The embodiment of the present invention does not specifically limit specific content of the morpheme self-explanation feature. During specific implementation, the morpheme self-explanation feature may include, but is not limited to, a morpheme proper noun type feature, a morpheme IDF feature, a morpheme word segmentation feature, a position feature of a morpheme in a query, and a global core score feature of a morpheme, and the like. In addition, the embodiment of the present invention does not specifically limit specific content of the morpheme word segmentation feature; during specific implementation, reference can be made to the following content, which is not described herein.

The morpheme cross feature is a feature that can indicate a relation between a morpheme and other morphemes in the query of the morpheme. There may be many kinds of specific features included in the morpheme cross feature, which, during specific implementation, includes, but is not limited to, one of a literal cross feature between morphemes, an average value feature of a morpheme transition probability in a query, a first transition probability feature of a morpheme and a second transition probability feature of the morpheme, a text classification related feature of a morpheme, a first cross feature between subject distribution of a morpheme and subject distribution of a query of the morpheme, and a PLSA subject similarity feature.

In addition, regarding the manner of determining a feature value of each preset feature of each piece of training data, in combination with specific content of each preset feature, different calculation manners may exist. During specific implementation, reference can be made to the following specific content:

1. If the preset feature includes the morpheme proper noun type feature in the morpheme self-explanation feature, then determining a feature value of each preset feature of each piece of training data includes, but is not limited to:

determining whether the morpheme in each piece of training data is a proper noun, if the morpheme in each piece of training data is a proper noun, determining that a feature value of the morpheme proper noun type feature in each piece of training data is 1, or otherwise, determining that the feature value of the morpheme proper noun type feature in each piece of training data is 0.

The embodiment of the present invention does not specifically limit the manner of determining whether the morpheme is a proper noun. During specific implementation, it can be determined according to a preformed vocabulary of proper nouns whether the morpheme is a proper noun. Specifically, if a morpheme is in the vocabulary of proper nouns, it is determined that the morpheme is a proper noun, or otherwise, the morpheme is not a proper noun. For example, if a morpheme in the training data is "Tushu (图书, literally "book")", a vocabulary of proper nouns is "Shangpin (商品, literally "commodity"), Tushu (图书, literally "book), Yinyue (音乐, literally "music")" and the like. As Tushu (图书, literally "book") is in the vocabulary of proper nouns, it is determined that "Tushu (图书, literally "book")" is a proper noun and it is determined that a feature value of the morpheme proper noun type feature of "Tushu (图书, literally "book")" is 1; if a morpheme in the training data is "Kuaidi (快递, literally "courier service")", as "Kuaidi (快递, literally "courier service")" is not in the vocabulary of proper nouns, it is determined that "Kuaidi (快递, literally "courier service")" is not a proper noun and it is determined that a feature value of the morpheme proper noun type feature of "Kuaidi (快递, literally "courier service")" is 0.

It should be noted that, in the example, only numbers "0" and "1" are taken as an example to describe the feature value of the morpheme proper noun type feature. However, during specific implementation, another value may also be used to indicate the feature value of the morpheme proper noun type feature. For example, if a morpheme is a proper noun, "0.9" can be used to indicate the feature value of the morpheme proper noun type feature; if the morpheme is not a proper noun, "0.1" can be used to indicate the feature value of the morpheme proper noun type feature, and the like. Similarly, in the following examples in the embodiment of the present invention, when the use of "0" and "1" is involved to indicate the feature value of the preset feature, only "0" and "1" are also taken as an example for description; during specific implementation, another value may also be used to indicate the feature value of the preset feature, which is not specifically limited in the embodiment of the present invention.

2. If the preset feature includes the morpheme IDF feature in the morpheme self-explanation feature, then determining a feature value of each preset feature of each piece of training data includes, but not limited to: calculating a morpheme IDF value in each piece of training data according to an IDF algorithm, and determining a feature value of the morpheme IDF feature as the morpheme IDF value. The embodiment of the present invention does not specifically limit the specific method for calculating a morpheme IDF value according to an IDF algorithm. During specific implementation, the morpheme IDF value can be obtained by dividing the total number of documents by the number of documents including the morpheme and then by evaluating the logarithm of the obtained quotient; for example, it is obtained through calculation that an IDF value of a certain morpheme is 0.8, the feature value of the morpheme IDF feature is 0.8.

If the preset feature is the morpheme word segmentation feature, the morpheme word segmentation feature at least includes the following features: a feature related to each morpheme in a preset morpheme library, a morpheme part-of-speech feature, a morpheme length feature, a length feature of the query of the morpheme, a feature of whether the morpheme includes a number, a feature of whether the morpheme includes an English letter, a feature of whether the morpheme is a website, and the like.

3. If the preset feature includes the feature related to each morpheme in the preset morpheme library in the morpheme self-explanation feature, then determining a feature value of each preset feature of each piece of training data includes, but not limited to: comparing a morpheme in each piece of training data with the preset morpheme library, where a feature value of a related feature between the morpheme per se in the preset morpheme library and each morpheme in the preset morpheme library is 1, and a feature value of a related feature between another morpheme in the preset morpheme library except the morpheme per se and each morpheme in the preset morpheme library is 0. For example, if the morpheme is "Kuaidi (快递, literally "courier service")" and the preset morpheme library is "Beijing (北京) Xianhua (鲜花, literally "flower") Kuaidi (快递, literally "courier service") Fuzhuang (Fuzhuang (服装, literally "clothing"), literally "clothes") Xiemao (鞋帽, literally "shoes and hats")", in this case, feature values of features related to each morpheme in the preset morpheme library are respectively (0, 0, 1, 0, 0).

The embodiment of the present invention does not specifically limit the size of the preset morpheme library and the order of morphemes in the preset morpheme library. For example, in combination with common morphemes in daily life, a morpheme library including about 400,000 morphemes may be formed. When a feature value of a feature of a morpheme per se is determined, respective morphemes in the morpheme library may be sorted previously, and the feature value of the feature of the morpheme per se is determined according to the order of the sorted morphemes.

4. If the preset feature includes the morpheme part-of-speech feature in the morpheme self-explanation feature, then determining a feature value of each preset feature of each piece of training data includes, but not limited to: determining a part of speech of each morpheme in each piece of training data, and determining a part-of-speech value corresponding to the part of speech of the morpheme according to a preset part-of-speech value table, so as to take the determined part-of-speech value as a feature value of the morpheme part-of-speech feature.

During specific implementation, as shown in Table 4, a part-of-speech value can be previously set for all parts of speech, so as to form a part-of-speech value table of parts of speech and part-of-speech values.

TABLE 4

| Part of speech | Part-of-speech value |
| --- | --- |
| noun | 2 |
| verb | 3 |
| ... | ... |

When a feature value of a morpheme part-of-speech feature of a certain morpheme is determined, a part of speech of the morpheme can be determined first, and then the feature value of the morpheme part-of-speech feature is determined by using the part-of-speech value table as shown in Table 4. For example, if a morpheme is "Xianhua (鲜花, literally "flower")", it is first determined that the part of speech of the morpheme is noun. As shown in Table 4, if the part-of-speech value corresponding to the noun recorded in the preset part-of-speech value table of parts of speech and part-of-speech values is 2, it is determined that the feature value of the morpheme part-of-speech feature of "Xianhua (鲜花, literally "flower")" is 2.

5. If the preset feature includes the morpheme length feature in the morpheme self-explanation feature, then determining a feature value of each preset feature of each piece of training data includes, but not limited to: determining a length value of a morpheme in each piece of training data, and determining a feature value of the morpheme length feature as the length value of the morpheme; there may be many manners of determining the length value of the morpheme, including, but not limited to, determining the length value of the morpheme according to the number of Chinese characters included in the morpheme or determining the length value of the morpheme according to the number of bytes included in the morpheme or the like; for example, when the length value of the morpheme is determined according to the number of Chinese characters included in the morpheme, if the morpheme is "Xianhua (鲜花, literally "flower")", as the length value of the morpheme is 2, the length value of the morpheme is determined as 2; for another example, if the morpheme is "Zenmeyang (怎么样, literally "how")", as the length value of the morpheme is 3, the length value of the morpheme is determined as 3.

6. If the preset feature includes the length feature of the query of the morpheme in the morpheme self-explanation feature, then determining a feature value of each preset feature of each piece of training data includes, but not limited to: determining a length value of the query of the morpheme in each piece of training data, and determining a feature value of the length feature of the query of the morpheme as the length value of the query of the morpheme. The embodiment of the present invention does not specifically limit the manner of determining the length value of the query of the morpheme. During specific implementation, reference can be made to the manner of determining the length value of the morpheme. For example, when the length value of the query of the morpheme is determined according to the number of Chinese characters of the query of the morpheme, if the query is "GuangziTuomaoDeXiaoguoZenmeyang (光了脱毛的效果怎么样, literally "how well does intense pulsed light hair removal work")", as the length value of the query of the morpheme is 10, the feature value of the length feature of the query of the morpheme is determined as 10.

7. If the preset feature includes the feature of whether the morpheme includes a number in the morpheme self-explanation feature, then determining a feature value of each preset feature of each piece of training data includes, but not limited to: determining whether a morpheme in each piece of training data includes a number, if the morpheme in each piece of training data includes a number, determining that a feature value of the feature of whether the morpheme in each piece of training data includes a number is 1, or otherwise, determining that a feature value of the feature of whether the any morpheme includes a number is 0. For example, if the morpheme is "12306", as the morpheme includes numbers, the feature value of the feature of whether the morpheme includes a number is determined as 1. For another example, if the morpheme is "Xianhua (鲜花, literally "flower")", as the morpheme does not include any number, the feature value of the feature of whether the morpheme includes a number is determined as 0.

8. If the preset feature includes the feature of whether the morpheme includes an English letter in the morpheme self-explanation feature, then determining a feature value of each preset feature of each piece of training data includes, but not limited to: determining whether a morpheme in each piece of training data includes an English letter, if the morpheme in each piece of training data includes an English letter, determining that a feature value of the feature of whether the morpheme in each piece of training data includes an English letter is 1, or otherwise, determining that a feature value of the feature of whether the morpheme in each piece of training data includes an English letter is 0. For example, if the morpheme is "URL", as the morpheme includes English letters, the feature value of the feature of whether the morpheme includes an English letter is 1. For another example, as the morpheme does not include any English letter, if the morpheme is "Kuaidi (快递, literally "courier service")", the feature value of the feature of whether the morpheme includes an English letter is determined as 0.

9. If the preset feature includes the feature of whether the morpheme is a website in the morpheme self-explanation feature, then determining a feature value of each preset feature of each piece of training data includes, but not limited to: determining whether a morpheme in each piece of training data is a website, if the morpheme in each piece of training data is a website, determining that a feature value of the feature of whether the morpheme in each piece of training data is a website is 1, or otherwise, determining that a feature value of the feature of whether the morpheme in each piece of training data is a website is 0. For example, if the morpheme is "www.abc.com", as the morpheme is a website, the feature value of the feature of whether the morpheme is a website is determined as 1. For another example, if the morpheme is "Beijing (北京)", as the morpheme is not a website, the feature value of the feature of whether the morpheme is a website is determined as 0.

There may be many manners of determining whether the morpheme is a website. During specific implementation, determination can be made in combination with features of a website. For example, many websites start with www. and ends with .com or .cn. Therefore, the determination of whether the morpheme is a website can be made in combination with the two features. Certainly, the website may also include other features, and herein, only the two features are taken as an example to describe the determination of whether the morpheme is a website. During specific implementation, it may also be determined in combination with other features of the website whether the morpheme is a website, which is not specifically limited in the embodiment of the present invention.

10. If the preset feature includes the position feature of the morpheme in the query in the morpheme self-explanation feature, then determining a feature value of each preset feature of each piece of training data includes, but not limited to: segmenting the query of the morpheme in each piece of training data, determining position information of the morpheme in each piece of training data in the segmented query, and determining that a feature value of the position feature of the morpheme in each piece of training data in the query is a value corresponding to position information of the morpheme in each piece of training data. For example, if the query is "GuangziTuomaoDeXiaoguoZenmeyang (光子脱毛的效果怎么样, literally "how well does intense pulsed light hair removal work")", the query is segmented to obtain "Guangzi/Tuomao/De/Xiaoguo/Zenmeyang (光子脱毛的效果怎么样, literally "intense pulsed light/hair removal/of/well/how")"; when the morpheme is "Tuomao (脱毛, literally "hair removal")", as "Tuomao (脱毛, literally "hair removal")" is in the second position of the query, the feature value of the position feature of the morpheme "Tuomao (脱毛, literally "hair removal")" in the query is 2.

11. If the preset feature includes the global core score feature of the morpheme in the morpheme self-explanation feature, then determining a feature value of each preset feature of each piece of training data includes, but not limited to: acquiring the value of the global core score of the morpheme in each piece of training data from a vocabulary, and determining a feature value of the global core score feature of the morpheme as the value of the global core score recorded in the vocabulary; for example, if the morpheme is "Xianhua (鲜花, literally "flower")" and the value of the global core score of "Xianhua (鲜花, literally "flower")" recorded in the vocabulary is 0.6, the feature value of the global core score feature of the morpheme "Xianhua (鲜花, literally "flower")" is 0.6.

The embodiment of the present invention does not specifically limit the manner of acquiring the vocabulary where the value of the global core score of the morpheme is recorded. During specific implementation, any number of queries including the morpheme can be extracted randomly, and when the any number of queries make up text pairs at random, relevance between every two text pairs is calculated, and the value of the global core score is determined as an average value of relevance of all extracted text pairs obtained through calculation. When the relevance between every two text pairs is calculated, the manner may include, but is not limited to, calculating cosines between vector space models corresponding to the two text pairs.

12. If the preset feature includes the literal cross feature between a morpheme and another morpheme in a query of the morpheme in the morpheme cross feature, the determining a feature value of each preset feature of each piece of training data includes, but is not limited to:

segmenting the query of the morpheme in each piece of training data, to obtain respective morphemes included in the query, combining the morphemes included in the query in pairs, to obtain morpheme combination pairs, and determining a feature value of a literal cross feature between a morpheme corresponding to a morpheme combination pair including the morpheme in the training data and another morpheme in the query of the morpheme as 1, and a feature value of a literal cross feature between a morpheme corresponding to a morpheme combination pair not including the morpheme in the training data and another morpheme in the query of the morpheme as 0; for example, if the query is T, a word segmentation result obtained by segmenting the query is T=$t_i t_j t_k$, and morphemes obtained after word segmentation are combined in pairs to obtain morpheme combination pairs $t_i$-$t_j$, $t_i$-$t_k$, and $t_j$-$t_k$. In this case, if the morpheme in the training data is $t_i$, a feature value of a literal cross feature between a morpheme corresponding to the morpheme combination pairs $t_i$-$t_j$ and $t_i$-$t_k$ including $t_i$ and other morphemes in the query of the morpheme is 1, and a feature value of a literal cross feature between a morpheme corresponding to the morpheme combination pair $t_j$-$t_k$ not including $t_i$ and other morphemes in the query of the morpheme is 0.

13. If the preset feature includes the average value feature of a morpheme transition probability in a query in the morpheme cross feature, then determining a feature value of each preset feature of each piece of training data includes, but not limited to: acquiring transition probabilities between a morpheme in each piece of training data and other morphemes in a query of the morpheme in each piece of training data according to a transition probability dictionary; and determining an average value of the transition probabilities between a morpheme in each piece of training data and other morphemes in a query of the morpheme in each piece of training data, and determining the average value of the transition probabilities as a feature value of the average value feature of a morpheme transition probability in a query.

The transition probability dictionary is obtained through offline training; during specific implementation, the transition probability dictionary can be acquired according to the following steps:

Step 1: Outputting queries included in a retrieval session in pairs, to obtain multiple query pairs, where each query pair obtained includes a first query and a second query. For example, if a retrieval session includes queries $T_1$, $T_2$, and $T_3$, query pairs obtained according to the retrieval session are $T_1$-$T_2$, $T_1$-$T_3$, and $T_2$-$T_3$.

Step 2: Segmenting first queries and second queries in all query pairs included in the retrieval session, and combine each morpheme in the first queries with each morpheme in the second queries to obtain a morpheme pair, where each morpheme pair includes a first morpheme in the first queries and a second morpheme in the second queries. For example, a word segmentation result obtained after word segmentation on the query pair $T_1$-$T_2$ is $t_1 t_2 t_3$-$t_1 t_5 t_6$, each morpheme in a first query in the query pair is combined with each morpheme in a second query, to obtain morpheme pairs of $t_1$-$t_1$, $t_1$-$t_5$, $t_1$-$t_6$, $t_2$-$t_1$, and so on.

Step 3: Counting the number of times any morpheme pair appears in the retrieval session and the number of times the first morpheme and the second morpheme in the any morpheme pair separately appear. For example, after the morpheme pairs are obtained, the number of times the morpheme pairs $t_1$-$t_1$, $t_1$-$t_5$, $t_1$-$t_6$, $t_2$-$t_1$ appear is recorded as once, and the number of times of $t_1$, $t_2$, $t_3$ and $t_5$ is also recorded as once. Likewise, all queries included in the retrieval session are processed, and the number of times any morpheme pair appears in the retrieval session and the number of times the first morpheme and the second morpheme in all morpheme pairs separately appear can be counted.

Step 4: Determining a transition probability of the first morpheme relative to the second morpheme in the any morpheme pair according to the number of times any morpheme pair appears in the retrieval session and the number of times the second morpheme in the any morpheme pair separately appears, and determine a transition probability of the second morpheme relative to the first morpheme according to the number of times any morpheme pair appears in the retrieval session and the number of times the first morpheme in the any morpheme pair separately appears.

The embodiment of the present invention does not specifically limit the manner of determining a transition probability of the first morpheme relative to the second morpheme in the any morpheme pair and a transition probability of the second morpheme relative to the first morpheme according to the number of times any morpheme pair appears in the retrieval session and the number of times the first morpheme and the second morpheme in the any morpheme pair separately appear. During specific implementation, the transition probabilities can be obtained through by using a Bayesian formula. For example, if $p(t_i|t_j)$ is used to denote the transition probability of the first morpheme relative to the second morpheme, $$p(t_i|t_j) = \frac{p(t_i, t_j)}{p(t_j)} = \frac{N(t_i, t_j)}{N(t_j)} \quad (3)$$

In the formula (3), $N(t_i, t_j)$ denotes the total number of times the morpheme pair $t_i$-$t_j$ appears in the retrieval session, and $N(t_j)$ denotes the number of times the morpheme $t_j$ separately appears in the retrieval session.

Step 5: Obtaining the transition probability dictionary according to transition probabilities of first morphemes relative to second morphemes in all morpheme pairs and transition probabilities of the second morphemes relative to the first morphemes.

The processing from Step 1 to Step 4 is performed on each morpheme pair included in the retrieval session, that is, transition probabilities of first morphemes relative to second morphemes in all morpheme pairs and transition probabilities of the second morphemes relative to the first morphemes can be obtained, so as to obtain the transition probability dictionary.

It should be noted that, when the transition probability dictionary is obtained by using Step 1 to Step 5, only that a certain retrieval session is selected is taken as an example for description, and as the number of queries included in the retrieval session may be limited, the transition probability dictionary obtained according to the retrieval session may only include transition probabilities of some morphemes. In order to obtain a comprehensive transition probability dictionary of morphemes, Step 1 to Step 5 can be performed on a large number of retrieval sessions, to obtain a transition probability dictionary including transition probabilities of more morphemes.

14. If the preset feature includes the first transition probability feature of the morpheme and the second transition probability feature of the morpheme in the morpheme cross feature, then determining a feature value of each preset feature of each piece of training data includes, but not limited to: querying a transition probability dictionary for a probability value of a first transition probability of a morpheme in each piece of training data and a probability value of a second transition probability of the morpheme, and respectively determining the probability value of the first transition probability and the probability value of the second transition probability as feature values of the first transition probability feature of the morpheme and the second transition probability feature of the morpheme.

The embodiment of the present invention does not specifically limit the specific content of a first transition probability feature of a morpheme and a second transition probability feature of the morpheme. During specific implementation, to facilitate research in a relation between the morpheme in the training data and a previous morpheme in the query of the morpheme as well as a relation between the morpheme and a next morpheme, a first transition probability feature of the morpheme can be a transition probability of the morpheme in the training data relative to the previous morpheme of the morpheme, and a second transition probability feature of the morpheme can be a transition probability feature of the morpheme in the training data relative to a next morpheme of the morpheme.

When a first transition probability feature of a morpheme and a second transition probability feature of the morpheme are respectively the transition probability feature of the morpheme in the training data relative to the previous morpheme of the morpheme and the transition probability feature of the morpheme in the training data relative to a next morpheme of the morpheme, then determining a feature value of each preset feature of each piece of training data includes: querying the transition probability dictionary, determining a probability value of a transition probability of the morpheme in the training data relative to a previous morpheme of the morpheme in the query and a probability value of a transition probability of the morpheme in the training data relative to a next morpheme of the morpheme in the query, and respectively determining the probability value of the transition probability of the morpheme in the training data relative to the previous morpheme of the morpheme and the probability value of the transition probability of the morpheme in the training data relative to a next morpheme of the morpheme that are queried from the transition probability dictionary as feature values of the first transition probability feature of the morpheme and the second transition probability feature of the morpheme respectively.

In addition, the embodiment of the present invention does not specifically limit the manner of acquiring the transition probability dictionary. During specific implementation, reference can be made to the manner of acquiring the transition probability dictionary in 13 and the transition probability dictionary the same as that in 13 is used.

Besides, the embodiment of the present invention only takes that a first transition probability feature of a morpheme and a second transition probability feature of the morpheme are respectively the transition probability feature of the morpheme in the query relative to the previous morpheme of the morpheme and the transition probability feature of the morpheme in the query relative to the next morpheme of the morpheme as an example for description; however, during specific implementation, a first transition probability feature of a morpheme and a second transition probability feature of the morpheme may also be transition probabilities between the morpheme in the training data and other morphemes in the query of the morpheme, which is not specifically limited in the embodiment of the present invention.

15. If the preset feature includes the text classification related feature of a morpheme in the morpheme cross feature and the text classification related feature of a morpheme includes related features between morphemes and each morpheme category in a morpheme classification library, then determining a feature value of each preset feature of each piece of training data includes, but not limited to: acquiring a first preset number of morpheme categories in the morpheme classification library of the morpheme in each piece of training data, determining a feature value of a related feature between the morpheme in each piece of training data and the first preset number of morpheme categories as a first feature value, and determining a feature value of a related feature between the morpheme in each piece of training data and other morpheme categories in the morpheme classification library except the first preset number of morpheme categories as a second feature value.

The embodiment of the present invention does not specifically limit the value of the first preset number of morpheme categories, which, during specific implementation, can be set according to requirements. In addition, the embodiment of the present invention does not specifically limit the specific values of the first feature value and the second feature value either. For example, the first feature value may be "1", the second feature value may be "0", and so on.

For example, if two morpheme categories are selected as the first preset number of morpheme categories and the two morpheme categories are respectively "Shangyi (上衣, literally "jacket")" and "Tixu (恤, literally "T-shirt")" and the morpheme classification library is "Duanxiu (短袖, literally "short sleeves") Changxiu (长袖, literally "long sleeves") Yurongfu (羽绒服, literally "down clothing") Mianyi (棉衣, literally "cotton clothing") Tixu (恤, literally "T-shirt") Dadi (打底, literally "leggings") Shangyi (上衣, literally "jacket")", feature values of related features between the morphemes and each morpheme category in the morpheme classification library are respectively (0 0 0 0 1 0 1).

The embodiment of the present invention does not specifically limit the method for acquiring the first preset number of morpheme categories in the morpheme classification library of the morpheme in each piece of training data. During specific implementation, the first preset number of morpheme categories can be obtained by querying a pre-obtained morpheme category distribution dictionary p(c|w), where c denotes a category and w denotes a morpheme. The morpheme category distribution dictionary p(c|w) records a probability that a certain morpheme belongs to a certain category. By querying the morpheme category distribution dictionary, the first preset number of categories obtained with the greatest probability is taken as the first preset number of morpheme categories of the morpheme. For example, if the morpheme is "Shouji (手机, literally "mobile phone")" and two categories are selected as the first preset number of morpheme categories of "Shouji (手机, literally "mobile phone")", by querying p(c|w), it is obtained that the first two categories of "Shouji (手机, literally "mobile phone")" with the greatest probabilities in p(c|w) are "Shuma (数码, literally "digital products")" and "Jiadian (家电, literally "home appliance")" respectively, and the two categories are determined as the first preset number of morpheme categories corresponding to "Shouji (手机, literally "mobile phone")".

The embodiment of the present invention does not specifically limit the manner of obtaining the morpheme category distribution dictionary p(c|w). During specific implementation, the manner may include, but not limited to, obtaining the morpheme category distribution dictionary by using the following steps:

First, classifying each webpage in a full-text matching classification manner for billions of webpages on the basis of a manually annotated first-class industrial category feature term set, to obtain a first classification attribute of each webpage.

Next, full-text segmentation is performed on each webpage having a classification attribute, extracting category feature terms in the webpage, calculating weight contributions (that is, weight vectors) that the extracted category feature terms made to their categories, and then incorporating the category feature terms extracted from the webpage into the first-class industrial category feature term set. The embodiment of the present invention does not specifically limit the manner of calculating weight contributions that the extracted category feature terms made to their categories.

Finally, upon completion of extraction of all webpage feature terms, a comprehensive first-class industrial category feature term set is automatically obtained, so as to construct a first-class industrial category feature term dictionary. The dictionary is described by using a formula p(c|w) and is for describing a probability that a morpheme belongs to a certain category, where c denotes a category and w denotes a morpheme, that is to say, each morpheme has a category.

16. If the preset feature includes the text classification related feature of a morpheme in the morpheme cross feature and the text classification related feature of a morpheme further includes related features between morphemes and each query category in a query classification library, then determining a feature value of each preset feature of each piece of training data further includes, but not limited to: acquiring a second preset number of query categories in the query classification library of the query of the morpheme in each piece of training data, determining a feature value of a related feature between the morpheme in each piece of training data and the second preset number of query categories as a third feature value, and determining a feature value of a related feature between the morpheme in each piece of training data and other query categories in the query classification library except the second preset number of query categories as a fourth feature value.

The embodiment of the present invention does not specifically limit the value of the second preset number of query categories and specific values of the third feature value and the fourth feature value, which, during specific implementation, can be set according to requirements.

For example, if the value of the second preset number of query categories is one and the query category is "Baihuo (百货, literally "general merchandise")", the query classification library is "Jiadian (家电, literally "home appliance") Shuma (数码, literally "digital products") Fuzhuang (服装, literally "clothing") Huwai (户外, literally "outdoors") Baihuo (百货, literally "general merchandise") Bangong (办公, literally "office supplies") Caizhuang (彩妆, literally "makeup") Muying (母婴, literally "baby products")". When the third feature value and the fourth feature value are respectively "1" and "0", feature values of related features between the morpheme and each query category in the query classification library are respectively (0 0 0 0 1 0 0 0).

The embodiment of the present invention does not specifically limit the method for acquiring a query category of a query of the morpheme in each piece of training data in a query classification library. During specific implementation, it is feasible to first acquire a morpheme category of each morpheme in the query according to the morpheme category distribution dictionary p(c|w) obtained in 15; and then multiply the morpheme category of each morpheme included in the query by a global IDF weight of the morpheme to obtain the query category p(c|T) through accumulation. The embodiment of the present invention does not specifically limit the method for calculating global IDF of the morpheme. During specific implementation, the global IDF of the morpheme may be calculated by dividing the total number of documents by the number of documents including the morpheme and then by evaluating the logarithm of the obtained quotient.

17. If the preset feature includes the text classification related feature of a morpheme in the morpheme cross feature and the text classification related feature of a morpheme further includes a second cross feature between a morpheme category of a morpheme and a query category of a query of the morpheme, then determining a feature value of each preset feature of each piece of training data further includes, but not limited to: determining each sub morpheme category under the first preset number of morpheme categories in the morpheme classification library of the morpheme in each piece of training data, and determining each sub query category under the second preset number of query categories in the query classification library of the query of the morpheme in each piece of training data; and constructing a second cross feature with each sub morpheme category and each sub query category, if any sub morpheme category is the same as the sub query category in any second cross feature are the same, determining a feature value of the any second cross feature as a fifth feature value, or if the sub morpheme category and the sub query category in any second cross feature are different, determining a feature value of the any second cross feature as a sixth feature value. The embodiment of the present invention does not specifically limit specific values of the fifth feature value and the sixth feature value, which, during specific implementation, can be set according to requirements.

For example, if the morpheme category library is "Duanxiu (短袖, literally "short sleeves") Changxiu (长袖, literally "long sleeves") Yurongfu (羽绒服, literally "down clothing") Mianyi (棉衣, literally "cotton clothing") Kuzi (裤子, literally "trousers") Dadi (打底, literally "leggings") Shangyi (上衣, literally "jacket")" and the query category library is "Jiadian (家电, literally "home appliance") Shuma (数码, literally "digital products") Fuzhuang (服装, literally "clothing") Huwai (户外, literally "outerdoors") Baihuo (百货, literally "general merchandise") Bangong (办公, literally "office supplies") Caizhuang (彩妆, literally "makeup") Muying (母婴, literally "baby products")", each morpheme category included in the morpheme category library may include various sub morpheme categories. For example, "Yurongfu (羽绒服, literally "down clothing")" in the morpheme category library may include sub morpheme categories of "Xiushen (修身, literally "slim fit") Changkuan (长款, literally "kneelength") Duankuan (短款, literally "waistlength") Baokuan (薄款, literally "thin")" and the like, and "Fuzhuang (服装, literally "clothing")" in the query category library may include sub query categories of "Shangyi (上衣, literally "jacket") Kuzi (裤子, literally "trousers") Xiushen (修身, literally "slim fit") Dadi (打底, literally "leggings") Changkuan (长款, literally "kneelength")". Therefore, when each sub morpheme category and each sub query category make up a second cross feature, multiple second cross features may be formed. For example, "Xiushen (修身, literally "slim fit")" under "Yurongfu (羽绒服, literally "down clothing")" and each of "Shangyi (上衣, literally "jacket") Kuzi (裤子, literally "trousers") Xiushen (修身, literally "slim fit") Dadi (打底, literally "leggings") Changkuan (长款, literally "kneelength")" under "Fuzhuang (服装, literally "clothing")" may form a second cross, for example, "Xiushen (修身, literally "slim fit")-Shangyi (上衣, literally "jacket")", "Xiushen (修身, literally "slim fit")-Kuzi (裤子, literally "trousers")", and the like. "Changkuan (长款, literally "kneelength")" under "Yurongfu (羽绒服, literally "down clothing")" and each of "Shangyi (上衣, literally "jacket") Kuzi (裤子, literally "trousers") Xiushen (修身, literally "slim fit") Dadi (打底, literally "leggings") Changkuan (长款, literally "kneelength")" under "Fuzhuang (服装, literally "clothing")" may also form a second cross. In addition, the sub morpheme category and the sub query category in the second cross feature may be the same, for example, "Xiushen (修身, literally "slim fit") Changkuan (长款, literally "kneelength")" that may be included in the sub morpheme category "Yurongfu (羽绒服, literally "down clothing")" is the same as "Xiushen (修身, literally "slim fit") Changkuan (长款, literally "kneelength")" that may be included in the sub query category "Fuzhuang (服装, literally "clothing")". Therefore, when the first preset number of morpheme categories include "Yurongfu (羽绒服, literally "down clothing")", the second preset number of query categories include "Fuzhuang (服装, literally "clothing")", and "1" and "0" are used to indicate feature values of the second cross feature, feature values of "Xiushen (修身, literally "slim fit")-Xiushen (修身, literally "slim fit")" and "Changkuan (长款, literally "kneelength")-Changkuan (长款, literally "kneelength")" are 1, and a feature value of others, such as "Xiushen (修身, literally "slim fit")-Kuzi (裤子, literally "trousers")", is 0.

18. If the preset feature includes the first cross feature between subject distribution of a morpheme and subject distribution of a query of the morpheme in the morpheme cross feature, then determining a feature value of each preset feature of each piece of training data includes, but not limited to: acquiring subject distribution of a third preset number of morphemes in a morpheme subject library of the morpheme in each piece of training data, and acquiring subject distribution of a fourth preset number of queries in a query subject library of a query of the morpheme in each piece of training data; determining subject distribution of each sub morpheme under subject distribution of the third preset number of morphemes in a morpheme subject library of the morpheme in each piece of training data, and determining subject distribution of each sub query under subject distribution of the fourth preset number of queries in the query subject library of the query of the morpheme in each piece of training data; and constructing one first cross feature with subject distribution of each sub morpheme and subject distribution of each sub query, if subject distribution of the sub morpheme and subject distribution of the sub query in any first cross feature are the same, determining a feature value of the any first cross feature as a seventh feature value, or if subject distribution of the sub morpheme and subject distribution of the sub query in any first cross feature are different, determining a feature value of the any first cross feature as an eighth feature value.

Similarly, the number of subject distribution of the third preset number of morphemes and subject distribution of the fourth preset number of queries and specific values of the seventh feature value and the eighth feature value can be set according to requirements, which are not specifically limited in the embodiment of the present invention.

In addition, there may be many manners of acquiring subject distribution of a third preset number of morphemes in a morpheme subject library of the morpheme in each piece of training data. During specific implementation, each document may be regarded as a word frequency vector, so as to convert text information into digital information easy for modeling. Specifically, if the manner of obtaining subject distribution of a morpheme is described in a probability language, it is described as follows:

If a probability that a document is selected is p(d), and a probability that each document belongs to a subject is p(z|d), when a subject is given, each morpheme is generated with a probability p(w|z). The process is formed into a joint probability model expression of:

$$p(d,w)=p(d)p(w|d)$$

$$p(w|d)=\Sigma_{z\in Z}p(w|z)p(z|d) \qquad (4).$$

Next, PLSA model parameter training is performed by using an Expectation-maximization (EM) algorithm, to obtain p(z|d) and p(w|z). Next, subject distribution p(z|w) of each morpheme is obtained by using a Bayesian formula p(z|w)=p(w|z)p(z)/p(w).

Through the above description, when a morpheme $t_i$ and its query T are given, subject distribution $p(z|t_i)$ of each morpheme can be acquired according to $p(z|w)$ for such a data pair.

After subject distribution of each morpheme is acquired, when subject distribution of the fourth preset number of queries in the query subject library of the query of the morpheme in each piece of training data are acquired, subject distribution $p(z|T)$ of the query may be obtained by multiplying subject distribution of respective morphemes in the query by a global IDF weight of the morpheme and then through accumulation.

In addition, the specific principle of determining a feature value of the first cross feature between the subject distribution of the morpheme and the subject distribution of the query of the morpheme is identical with the principle of determining the feature value of the second cross feature between the morpheme category of the morpheme and the query category of the query of the morpheme, and reference can be made to the principle of determining the feature value of the second cross feature between the morpheme category of the morpheme and the query category of the query of the morpheme for details, which is not exemplified herein.

19. If the preset feature includes the PLSA subject similarity feature in the morpheme cross feature, then determining a feature value of each preset feature of each piece of training data includes, but not limited to: acquiring subject distribution of a third preset number of morphemes in a morpheme subject library of the morpheme in each piece of training data, and acquiring subject distribution of a fourth preset number of queries in a query subject library of a query of the morpheme in each piece of training data; and calculating a subject similarity value between subject distribution of each morpheme and subject distribution of each query, and determining each subject similarity value obtained through calculation as a feature value of the PLSA subject similarity feature.

The subject similarity value between subject distribution of each morpheme and subject distribution of each query may be calculated according to the subject distribution of the morpheme and the subject distribution of the query of the morpheme. During specific implementation, the manner may include, but is not limited to, the following formula:

$$Sim_{plsa}(t_i, T) = \frac{p(z|t_i) \cdot p(z|T)}{\|p(z|t_i)\| \|p(z|T)\|}. \tag{5}$$

In the formula, $t_i$ is a morpheme in the training data, T is the query of the morpheme in the training data, $p(z|t_i)$ is subject distribution of the morpheme, $p(z|T)$ is subject distribution of the query of the morpheme, and $\|p(z|t_i)\|$ and $\|p(z|T)\|$ are respectively second-order norms of $p(z|t_i)$ and $p(z|T)$.

In conclusion, the feature value of each preset feature of each piece of training data can be determined according to the content of the step, so as to ensure that a model parameter can be determined according to the feature value of each preset feature of all training data and importance scores of morphemes included in all training data; please refer to the following step for details.

Step 203: Determining a model parameter according to the feature value of each preset feature of all training data and importance scores of morphemes included in all training data.

The importance score of the morpheme in each piece of training data and the feature value of each preset feature of each piece of training data can be determined by using Step 201 and Step 202, and the model parameter can be determined by substituting the importance score of the morpheme in each piece of training data and the feature value of each preset feature of each piece of training data into a formula of a preset model.

For example, if the preset model is a logistic regression model, the logistic regression model is expressed with a formula as:

$$p(Y=1|x) = \pi(x) = \frac{1}{1+e^{-g(x)}} \tag{6}$$

where $g(x) = \beta_0 + \beta_1 x_1 + \beta_2 x_2 + \ldots + \beta_p x_p$, $x_1, x_2 \ldots x_p$ are variables corresponding to each preset feature, and $\beta_0, \beta_1 \ldots \beta_p$ are model parameters.

In the case of determination of the model parameters of the logistic regression model, the model parameters of the logistic regression model can be obtained by substituting the importance score of the morpheme in each piece of training data into $\pi(x)$ and substituting the feature value of each preset feature of each piece of training data into the variables corresponding to each preset feature. For example, if the logistic regression model is specifically:

$$p(Y=1|x) = \pi(x) = \frac{1}{1+e^{-g(x)}}, \text{ and} \tag{7}$$

$$g(x) = \beta_0 + \beta_1 x_1 + \beta_2 x_2.$$

In this case, it is determined according to parameter points of the model that it is necessary to acquire at least three pieces of training data. If the acquired training data is respectively "ChiShenmeKeyiZhanggao (吃什么可以长高, literally "What should I eat to grow taller") Zhanggao (长高, literally "grow taller") 0.8", "DouleiDeYingyangJiazhi (豆类的营养价值, literally "nutrients in beans") Yingyang (营养, literally "nutrition") 0.5" and "ShenmeKuaidiJingjiYouShihui (什么快递经济又实惠, literally "which courier service is cheaper and better") Kuaidi (快递, literally "courier service") 0.85", and feature values of two preset features corresponding to $x_1$ and $x_2$ in Formula (7) of "ChiShenmeKeyiZhanggao (吃什么 可以长高, literally "What should I eat to grow taller") are respectively 0.8 and 1, feature values of the two preset features corresponding to $x_1$ and $x_2$ in Formula (7) of "DouleiDeYingyangJiazhi (豆类的营养价值, literally "nutrients in beans") Yingyang (营养, literally "nutrition") 0.5" are respectively 0.2 and 0.7, and feature values of the two preset features corresponding to $x_1$ and $x_2$ in Formula (7) of "ShenmeKuaidiJingjiYouShihui (什么快递经济又实惠, literally "which courier service is cheaper and better") Kuaidi (快递, literally "courier service") 0.85" are respectively 0.3 and 0. In the case of determination of the model parameters of the logistic regression model, first substitute 0.8 into $\pi(x)$ of Formula (7) to obtain $g_1(x)$ corresponding to $\pi(x)$, and substitute 0.8 and 1 into $x_1$ and $x_2$ respectively; next, substitute 0.5 into $\pi(x)$ of Formula (7) to obtain $g_2(x)$ corresponding to $\pi(x)$, and substitute 0.2 and 0.7 into $x_1$ and $x_2$ respectively; moreover, substitute 0.85 into $\pi(x)$ of Formula (7) to obtain $g_3(x)$ corresponding to $\pi(x)$, and substitute 0.3 and 0 into $x_1$ and $x_2$ respectively, so as to obtain three equations, by using the three equations, $\beta_0$, $\beta_1$, and $\beta_2$ in Formula (7) can be determined, and the determined $\beta_0$, $\beta_1$, and $\beta_2$ are the model parameters in Formula (7).

Determination of the model parameters according to the feature value of each preset feature of all training data and the importance scores of the morphemes in all training data can be achieved by using many algorithms. During specific implementation, the algorithms include, but are not limited to, an L-BFGS algorithm and a conjugate gradient algorithm.

Step 204: Determining the morpheme importance analysis model according to the determined model parameter.

For ease of description, Formula (7) and the example corresponding to Formula (7) in Step 203 are still taken as an example. If it is determined by using Step 203 that $\beta_0$, $\beta_1$, and $\beta_2$ in Formula (7) are respectively 0.22, 0.17, and 0.61, the morpheme importance analysis model determined according to the determined model parameter is:

$$p(Y=1\mid x) = \pi(x) = \frac{1}{1+e^{-g(x)}},$$

and $$g(x)=0.22+0.17x_1+0.61x_2.$$

In one embodiment, after the model parameters are determined, each model parameter can be taken as a weight of the preset feature corresponding to each model parameter, and is used to represent a weight contribution of each preset feature to analysis of morpheme importance.

For ease of explanation of the content, a specific example is given below to describe the above process. In the example, the training data is set as "GuangziTuomaoDeXiaoguoZenmeyang (光子脱毛的效果怎么样, literally "how well does intense pulsed light hair removal work") Tuomao (脱毛, literally "hair removal") 1.0". "GuangziTuomaoDeXiaoguoZenmeyang (光子脱毛的效果怎么样, literally "how well does intense pulsed light hair removal work")" is a query, "Tuomao (脱毛, literally "hair removal")" is a morpheme in the training data, "1.0" is an importance score of "Tuomao (脱毛, literally "hair removal")" in "GuangziTuomaoDeXiaoguoZenmeyang (光子脱毛的效果怎么样, literally "how well does intense pulsed light hair removal work")", and the preset model is a logistic regression model. In addition, "GuangziTuomaoDeXiaoguoZenmeyang (光子脱毛的效果怎么样, literally "how well does intense pulsed light hair removal work")" is segmented, to obtain that morphemes obtained after word segmentation of the query are "Guangzi/Tuomao/De/Xiaoguo/Zenmeyang (光子脱毛的效果怎么样, literally "intense pulsed light/hair removal/of/well/how")".

After the training data is determined, it is necessary to determine a feature value of each preset feature of the training data. Feature values of respective preset features of the training data can be determined according to the method for determining respective preset features and the feature values of the respective preset features described in Step 202, which are specifically:

(1) Morpheme proper noun type feature: As "Tuomao (脱毛, literally "hair removal")" is not a proper noun and no morphemes in the training data belong to proper nouns, in this case, if preset feature variables assigned to the morpheme proper noun type feature of each morpheme in the query are from $x_1$-$x_{10}$ in the formula of the logistic regression model, 0 is substituted into $x_1$-$x_{10}$ when the model parameters of the logistic regression model are determined by using the training data. That is, the morpheme proper noun type feature of the training data does not need to be involved in calculation.

(2) Morpheme IDF feature: If an IDF value of "Tuomao (脱毛, literally "hair removal")" obtained through calculation according to an IDF algorithm is 0.8, a feature value of the morpheme IDF feature of the training data is 0.8. In this case, if $x_{11}$ in the formula of the logistic regression model is a preset feature variable assigned to the morpheme IDF feature, 0.8 is substituted into $x_{11}$ when the model parameters of the logistic regression model are determined by using the training data.

(3) A feature related to each morpheme in a preset morpheme library: As "Tuomao (脱毛, literally "hair removal")" is a morpheme, a feature value of a related feature between the morpheme and each morpheme in the preset morpheme library is 1. In this case, if $x_{12}$-$x_{21}$ in the formula of the logistic regression model are preset feature variables assigned to the feature related to each morpheme in the preset morpheme library, $x_{12}$-$x_{22}$ respectively correspond to each morpheme in the preset morpheme library, and "Tuomao (脱毛, literally "hair removal")" is the second morpheme in the preset morpheme library, values respectively substituted into $x_{12}$-$x_{21}$ are 0100000000 when the model parameters of the logistic regression model are determined by using the training data. Certainly, herein, only that the preset morpheme library includes 10 morphemes is taken as an example; however, in practice, the number of morphemes included in the preset morpheme library is a huge database, and the embodiment of the present invention does not specifically limit the number of morphemes included in the preset morpheme library.

(4) Morpheme part-of-speech feature: As "Tuomao (脱毛, literally "hair removal")" is a verb, and if the part-of-speech value of a verb recorded in the part-of-speech value table is 3, in this case, if $x_{22}$ in the formula of the logistic regression model is a preset feature variable assigned to the morpheme part-of-speech feature, 3 is substituted into $x_{22}$ when the model parameters of the logistic regression model are determined by using the training data.

(5) Morpheme length feature: When a length value of a morpheme is determined according to the number of Chinese characters included in the morpheme, as "Tuomao (脱毛, literally "hair removal")" includes two Chinese characters, the feature value of the morpheme length feature of "Tuomao (脱毛, literally "hair removal")" is 2. In this case, if $x_{23}$ in the formula of the logistic regression model is a preset feature variable assigned to the morpheme length feature, 2 is substituted into $x_{23}$ when the model parameters of the logistic regression model are determined by using the training data.

(6) Length feature of the query of the morpheme: When a length value of a morpheme is determined according to the number of Chinese characters included in the morpheme, as the query "GuangziTuomaoDeXiaoguoZenmeyang (光子脱毛的效果怎么样, literally "how well does intense pulsed light hair removal work")" of "Tuomao (脱毛, literally "hair removal")" includes 10 Chinese characters, the feature value of the length feature of the query of the morpheme "Tuomao (脱毛, literally "hair removal")" is 10. In this case, if $x_{24}$ in the formula of the logistic regression model is a preset feature variable assigned to the length feature of the query of the morpheme, 10 is substituted into $x_{24}$ when the model parameters of the logistic regression model are determined by using the training data.

(7) Feature of whether the morpheme includes a number: As "Tuomao (脱毛, literally "hair removal")" does not include any number, the feature value of the feature of whether the morpheme "Tuomao (脱毛, literally "hair removal")" includes a number is 0. In this case, if $x_{25}$ in the formula of the logistic regression model is a preset feature variable assigned to the feature of whether the morpheme includes a number, 0 is substituted into $x_{25}$ when the model parameters of the logistic regression model are determined by using the training data.

(8) Feature of whether the morpheme includes an English letter: As "Tuomao (脱, 毛, literally "hair removal")" does not include any English letter, the feature value of the feature of whether the morpheme "Tuomao (脱毛, literally "hair removal")" includes an English letter is 0. In this case, if $x_{26}$ in the formula of the logistic regression model is a preset feature variable assigned to the feature of whether the morpheme includes an English letter, 0 is substituted into $x_{26}$ when the model parameters of the logistic regression model are determined by using the training data.

(9) Feature of whether the morpheme is a website: As "Tuomao (脱毛, literally "hair removal")" is not a website, the feature value of the feature of whether the morpheme "Tuomao (脱毛, literally "hair removal")" is a website is 0. In this case, if $x_{27}$ in the formula of the logistic regression model is a preset feature variable assigned to the feature of whether the morpheme is a website, 0 is substituted into $x_{27}$ when the model parameters of the logistic regression model are determined by using the training data.

(10) Position feature of the morpheme in the query: As "Tuomao (脱毛, literally "hair removal")" is in the second position of the query "GuangziTuomaoDeXiaoguoZenmeyang (光子脱毛的效果怎么样, literally "how well does intense pulsed light hair removal work")", the feature value of the position feature of the morpheme "Tuomao (脱毛, literally "hair removal")" in the query is 2. In this case, if $x_{28}$ in the formula of the logistic regression model is a preset feature variable assigned to the position feature of the morpheme in the query, 2 is substituted into $x_{28}$ when the model parameters of the logistic regression model are determined by using the training data.

(11) Global core score feature of the morpheme: If the value of the global core score of "Tuomao (脱毛, literally "hair removal")" acquired from the vocabulary is 0.6, the feature value of the global core score feature of the morpheme "Tuomao (脱毛, literally "hair removal")" is 0.6. In this case, if $x_{29}$ in the formula of the logistic regression model is a preset feature variable assigned to the global core score feature of the morpheme, 0.6 is substituted into $x_{29}$ when the model parameters of the logistic regression model are determined by using the training data.

(12) Literal cross feature between a morpheme and another morpheme in a query of the morpheme: As a word segmentation result obtained by segmenting the query of "Tuomao (脱毛, literally "hair removal")" is "Guangzi/Tuomao/De/Xiaoguo/Zenmeyang (光子/脱毛/的/效果/怎么样, literally "intense pulsed light/hair removal/of/well/how")", in the determination of the feature value of the literal cross feature between "Tuomao (脱毛, literally "hair removal")" and other morphemes in the query "Guangzi/Tuomao/De/Xiaoguo/Zenmeyang (光子/脱毛/的/效果/怎么样, literally "intense pulsed light/hair removal/of/well/how")" of "Tuomao (脱毛, literally "hair removal")", morphemes included in the query are combined in pairs, to obtain morpheme combination pairs such as "Guangzi (光子, literally "intense pulsed light")-Tuomao (脱毛, literally "hair removal")", "Guangzi (光子, literally "intense pulsed light")-Shi (是, literally "yes")", "Guangzi (光子, literally "intense pulsed light")-Xiaoguo (效果, literally "well")", "Guangzi (光子, literally "intense pulsed light")-Zenmeyang (怎么样, literally "how")", "Tuomao (脱毛, literally "hair removal")-Shi (是, literally "yes")", "Tuomao (脱毛, literally "hair removal")-Xiaoguo (效果, literally "well")", "Tuomao (脱毛, literally "hair removal")-Zenmeyang (怎么样, literally "how")". As "Guangzi (光子, literally "intense pulsed light")-Tuomao (脱毛, literally "hair removal")", "Tuomao (脱毛, literally "hair removal")-Shi (是, literally "yes")", "Tuomao (脱毛, literally "hair removal")-Xiaoguo (效果, literally "well")" and "Tuomao (脱毛, literally "hair removal")-Zenmeyang (怎么样, literally "how")" include the morpheme "Tuomao (脱毛, literally "hair removal")", it is determined that the feature value of the literal cross feature between the morpheme of the morpheme combination pairs including "Tuomao (脱毛, literally "hair removal")" and other morphemes in the query of the morpheme is 1 and the feature value of the literal cross feature between the morpheme of other morpheme combination pairs not including "Tuomao (脱毛, literally "hair removal")" and other morphemes in the query of the morpheme is 0. In this case, if $x_{30}$-$x_{40}$ in the formula of the logistic regression model are preset feature variables assigned to the literal cross feature between the morpheme of each morpheme in the query and other morphemes in the query of the morpheme, and $x_{30}$-$x_{40}$ respectively correspond to morphemes such as $t_1$-$t_2$, $t_2$-$t_3$, and $t_2$-$t_4$ in the query, values respectively substituted into $x_{30}$-$x_{40}$ are 1000111000 when the model parameters of the logistic regression model are determined by using the training data. Certainly, herein only that 10 preset feature variables are assigned to the literal cross feature between a morpheme and another morpheme in a query of the morpheme is taken as an example, however, in practice, the number of preset feature variables assigned to the literal cross feature between a morpheme and another morpheme in a query of the morpheme should be combined with the number of the morphemes included in the query.

(13) Average value feature of a morpheme transition probability in the query: Through query of a transition probability dictionary and calculation, it is obtained that an average value of transition probabilities between "Tuomao (脱毛, literally "hair removal")" in "GuangziTuomaoDeXiaoguoZenmeyang (光子脱毛的效果怎么样, literally "how well does intense pulsed light hair removal work")" and other morphemes in "GuangziTuomaoDeXiaoguoZenmeyang (光子脱毛的效果怎么样, literally "how well does intense pulsed light hair removal work")" is 0.52, and the feature value of an average value feature of a morpheme transition probability in a query is 0.52. In this case, if $x_{31}$ in the formula of the logistic regression model is a preset feature variable assigned to an average value feature of a morpheme transition probability in a query, 0.52 is substituted into $x_{31}$ when the model parameters of the logistic regression model are determined by using the training data.

(14) First transition probability feature of the morpheme and second transition probability feature of the morpheme: When the first transition probability feature of the morpheme is a transition probability of the morpheme in the training data relative to a previous morpheme of the morpheme and the second transition probability feature of the morpheme is a transition probability of the morpheme in the training data relative to a next morpheme of the morpheme, it is obtained by querying a transition probability dictionary that p(Tuomao (脱毛, literally "hair removal")|Guangzi (光子, literally "intense pulsed light"))=0.78 and p(脱毛|Xiaoguo (效果, literally "well"))=0.1, and the feature values of the first transition probability feature of the morpheme and the second transition probability feature of the morpheme are respectively 0.78 and 0.1. In this case, if $x_{32}$-$x_{33}$ in the formula of the logistic regression model are preset feature variables assigned to the features related to transition probabilities, values respectively substituted into $x_{32}$ and $x_{33}$ are 0.78 and 0.1 when the model parameters of the logistic regression model are determined by using the training data.

(15) Related feature between the morpheme and each morpheme category in a morpheme classification library: If the value of the first preset number of morpheme categories is 2, "1" and "0" are respectively used to indicate values of the first feature value and the second feature value. It is obtained by querying a transition probability dictionary that two morpheme categories with the greatest probabilities in the category of "Tuomao (脱毛, literally "hair removal")" are respectively "Meirong (美容, literally "beauty")" and "Yiliao (医疗, literally "medical treatment")". Therefore, the feature value of the related feature of "Tuomao (脱毛, literally "hair removal")" and "Meirong (美容, literally "beauty")" and "Yiliao (医疗, literally "medical treatment")" in the morpheme classification library is 1, and the feature value of the related feature of other morpheme categories in the morpheme classification library except "Meirong (美容, literally "beauty")" and "Yiliao (医疗, literally "medical treatment")" is 0. In this case, if $x_{34}$-$x_{38}$ in the formula of the logistic regression model are preset feature variables assigned to the related feature between the morpheme and each morpheme category in a morpheme classification library and if the morpheme classification library is "Yiliao (医疗, literally "medical treatment") Shoushen (瘦身, literally "weight loss") Fuzhuang (服装, literally "clothing") Xiemao (鞋帽, literally "shoes and hats") Meirong (美容, literally "beauty")", values respectively substituted into $x_{34}$-$x_{38}$ are 10001 when the model parameters of the logistic regression model are determined by using the training data.

(16) Related feature between the morpheme and each query category in a query classification library: If the value of the second preset number of query categories is 1, "1" and "0" are respectively used to indicate values of the third feature value and the fourth feature value. The query category of the query "GuangziTuomaoDeXiaoguoZenmeyang (光子脱毛的效果怎么样, literally "how well does intense pulsed light hair removal work")" of "Tuomao (脱毛, literally "hair removal")" is "Meirong (美容, literally "beauty")", and it is determined that the feature value of the related feature between "Tuomao (脱毛, literally "hair removal")" and "Meirong (美容, literally "beauty")" in the query classification library is 1, and the feature value of the related feature of other query categories in the query classification library except "Meirong (美容, literally "beauty")" is 0. If the query classification library is "Shipin (食品, literally "food") Shuma (数码, literally "digital products") Jiadian (家电, literally "home appliance") Shoushen (瘦身, literally "weight loss") Meirong (美容, literally "beauty")" and if $x_{39}$-$x_{43}$ in the formula of the logistic regression model are preset feature variables assigned to the related feature between the morpheme and each query category in a query classification library, values respectively substituted into $x_{39}$-$x_{43}$ are 00001 when the model parameters of the logistic regression model are determined by using the training data.

(17) Second cross feature between a morpheme category of a morpheme and a query category of a query of the morpheme: In combination with (15) and (16), if the morpheme classification library is "Yiliao (医疗, literally "medical treatment") Shoushen (瘦身, literally "weight loss") Fuzhuang (服装, literally "clothing") Xiemao (鞋帽, literally "shoes and hats") Meirong (美容, literally "beauty")" and the query classification library is "Shipin (食品, literally "food") Shuma (数码, literally "digital products") Jiadian (家电, literally "home appliance") Shoushen (瘦身, literally "weight loss") Meirong (美容, literally "beauty")", as each morpheme category included in the morpheme classification library may include various sub morpheme categories, for example, "Yiliao (医疗, literally "medical treatment")" in a first preset number of morpheme categories may include sub morpheme categories of "Baojianpin (保健品, literally "dietary supplement") Yiliao (医疗, literally "medical treatment") Qiju (器具, literally "device") Anmoqiju (按摩器具, literally "massage device")" and the like, and the category "Meirong (美容, literally "beauty")" in a second preset number of query categories may include sub query categories of "Anmoqiju (按摩器具, literally "massage device") Huazhuangpin (化妆品, cosmetics) Baojianpin (保健品, literally "dietary supplement")". As "Yiliao (医疗, literally "medical treatment")" and "Meirong (美容, literally "beauty")" include the same sub categories "Anmoqiju (按摩器具, literally "massage device") Baojianpin (保健品, literally "dietary supplement")", if "1" and "0" are respectively used to indicate values of the fifth feature value and the sixth feature value, the feature value of the second cross feature corresponding to "Anmoqiju (按摩器具, literally "massage device") Baojianpin (保健品, literally "dietary supplement")" is 1, and the feature value of the second cross feature between other morpheme categories and query categories is 0. In this case, if $x_{44}$-$x_{54}$ in the formula of the logistic regression model are preset feature variables assigned to the second cross feature between a morpheme category of a morpheme and a query category of a query of the morpheme and $x_{48}$ and $x_{51}$ are respectively preset feature variables corresponding to "Anmoqiju (按摩器具, literally "massage device")-Anmoqiju (按摩器具, literally "massage device")" and "Baojianpin (保健品, literally "dietary supplement")-Baojianpin (保健品, literally "dietary supplement")", when the model parameters of the logistic regression model are determined by using the training data, 1 is substituted into $x_{48}$ and $x_{51}$ respectively, and values substituted into other preset variables in $x_{44}$-$x_{54}$ except $x_{48}$ and $x_{51}$ are 0.

(18) First cross feature between subject distribution of the morpheme and subject distribution of the query of the morpheme: The first cross feature between subject distribution of the morpheme and subject distribution of the query of the morpheme has a similar principle of calculating the feature value of the second cross feature between the morpheme category of the morpheme and the query category of the query of the morpheme, and when the model parameters of the logistic regression model are determined by using the first cross feature between subject distribution of the morpheme and subject distribution of the query of the morpheme, feature values substituted into the preset feature variables are also similar, and reference can be made to the example in (17) for details, which are not repeated herein.

(19) PLSA subject similarity feature: If subject similarity values of subject distribution of each morpheme and subject distribution of each query of "Tuomao (脱毛, literally "hair removal")" and "GuangziTuomaoDeXiaoguoZenmeyang (光子脱毛的效果怎么样, literally "how well does intense pulsed light hair removal work")" obtained through calculation are respectively 0.77, 0.81, 0.56, 0.21 and 0.98 and if $x_{55}$-$x_{59}$ in the formula of the logistic regression model are preset feature variables assigned to the PLSA subject similarity feature, values respectively substituted into $x_{55}$-$x_{59}$ are 0.77, 0.81, 0.56, 0.21 and 0.98 when the model parameters of the logistic regression model are determined by using the training data.

A morpheme importance analysis model is determined by using the above steps, that is, the step of determining a morpheme importance analysis model in the embodiment of the present invention is accomplished, and in the following, the determined morpheme importance analysis model can be used to calculate an importance score of each morpheme in the query, and importance of the morpheme in the query is analyzed by using the importance score of each morpheme obtained through calculation.

The method for analyzing importance of the morpheme in the query by using the determined morpheme importance analysis model is described below in detail with reference to Step 205.

Step 205: Analyzing importance of the morpheme in the query by using the determined morpheme importance analysis model.

The step is a preferred step, in which the morpheme importance analysis model determined by using Step 201 to Step 204 is used to calculate an importance score of each morpheme in a query to be analyzed, and analyze importance of the morpheme in the query by using the importance score of each morpheme obtained through calculation.

The process of analyzing importance of the morpheme in the query by using the determined morpheme importance analysis model is exemplified below by using a specific example, and in the example, the morpheme importance analysis model that has been determined in Step 204 is taken as an example. The morpheme importance analysis model determined in Step 204 is:

$$p(Y=1 \mid x) = \pi(x) = \frac{1}{1+e^{-g(x)}} \quad (8)$$

and $g(x) = 0.22 + 0.17x_1 + 0.61x_2$.

If the query to be analyzed is "ShenmeKuaidiZuihao (什么快递最好, literally "which courier service is the best")", a word segmentation result for segmenting the query is "Shenme/Kuaidi/Zuihao (什么/快递/最好, literally "which/courier service/the best")". If the morpheme is "Kuaidi (快递, literally "courier service")" and if it is determined by using Step 202 that feature values of preset features corresponding to $x_1$ and $x_2$ in the query are respectively 0.7 and 0.3, in this case, 0.7 and 0.3 are respectively substituted into $x_1$ and $x_2$ in Formula (8) to obtain that $g(x)$ is 0.522, the obtained 0.522 is substituted into Formula (8) to obtain that $\pi(x)$ is $1/1+e^{-0.522}$, and the obtained $1/1+e^{-0.522}$ is the importance score of "Kuaidi (快递, literally "courier service")" in "ShenmeKuaidiZuihao (什么/快递/最好, literally "which courier service is the best")".

The following is a result of an importance score of each morpheme of the query in the query obtained by using the determined morpheme importance analysis model and a computer.

query_str: "NaliGoumaiXinkuanGaogenliangxie (哪里购买新款高跟凉鞋, literally "where can I buy new high-heeled sandals")"

--- result{
result_core: 0.0097791003063321114
result_str: "Nali (哪里, literally "where")"
}
result{
result_core: 0.18395957350730896
result_str: "Goumai (购买, literally "buy")"
}
result{
result_core: 0.50422912836074829
result_str: "Xinkuan (新款, literally "new")"
}
result{
result_core: 0.581104040145874
result_str: "Gaogen (高跟, literally "high-heeled")"
}
result{
result_core: 0.863193929195404
result_str: "Liangxie (凉鞋, literally "sandals")"
}

---

In the analysis result, query_str is a query input by a user, result core denotes an important score of a certain morpheme of the query in the query, and result str is a certain morpheme in the query.

It can be obtained by using the analysis result that the query is "NaliGoumaiXinkuanGaogenliangxie (哪里购买新款高跟凉鞋, literally "where can I buy new high-heeled sandals")", and it can be determined according to the important score of a certain morpheme of the query in the query that, in "NaliGoumaiXinkuanGaogenliangxie (哪里购买新 款高跟凉鞋, literally "where can I buy new high-heeled sandals")", the most important morpheme is "Liangxie (凉鞋, literally "sandals")", followed by "Gaogen (高跟, literally "high-heeled")", and so on. Therefore, when information and services are provided for the user inputting the query, emphasis can be placed on morphemes such as "Liangxie (凉鞋, literally "sandals")" and "Gaogen (高跟, literally "high-heeled")".

In the method according to the embodiment of the present invention, when a model parameter is determined according to acquired training data, a morpheme importance analysis model is determined according to the determined model parameter, and further analysis of morpheme importance is achieved by using the morpheme importance analysis model, not only a computing speed becomes higher and efficiency of analyzing morpheme importance is improved, but also accuracy becomes higher.

Embodiment 3

Figure 3:
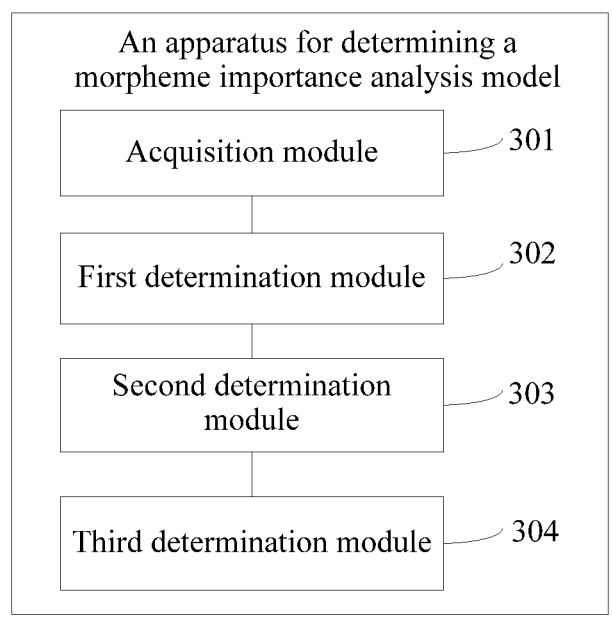
FIG. 3 is a schematic structural diagram of an apparatus for determining a morpheme importance analysis model according to some embodiments of the present disclosure.

The embodiment of the present invention provides an apparatus for determining a morpheme importance analysis model, referring to FIG. 3, the apparatus including:

an acquisition module 301, configured to acquire at least two pieces of training data, each piece of training data including a query, any morpheme in the query, and an importance score of the any morpheme in the query;

a first determination module 302, configured to determine a feature value of each preset feature of each piece of training data, the preset feature at least including one of a morpheme self-explanation feature and a morpheme cross feature;

a second determination module 303, configured to determine a model parameter according to the feature value of each preset feature of all training data and importance scores of morphemes included in all training data, where the number of the model parameters depends on the number of the preset features, and the number of the model parameters is not greater than the number of pieces of the training data; and a third determination module 304, configured to determine a morpheme importance analysis model according to the determined model parameter.

In one embodiment, the acquisition module 301 includes:

a first acquisition unit, configured to acquire at least one query from historical query data, the historical query data being at least one piece of historical data in a retrieval log, a historical extension relation vocabulary, and a click log;

a second acquisition unit, configured to acquire at least one morpheme in the query;

a first determination unit, configured to determine an importance score of each morpheme in the query; and a second determination unit, configured to determine the at least two pieces of training data according to the acquired query, morphemes in each query, and the importance scores of the morphemes in the query.

In one embodiment, when the historical query data is the historical data in the retrieval log, the second determination unit includes:

a first obtaining subunit, configured to obtain all morphemes in the query;

a first count subunit, configured to respectively count the number of times each morpheme appears and the total number of times all morphemes in the query appear; and a first determination subunit, configured to determine the importance score of each morpheme in the query according to the number of times each morpheme appears and the total number of times all morphemes in the query appear.

In one embodiment, when the historical query data is the historical data in the historical extension relation vocabulary and the historical data includes a query and relational words corresponding to the query, the second determination unit includes:

a second obtaining subunit, configured to obtain all morphemes in the query;

a second count subunit, configured to respectively count the number of times each morpheme appears and the total number of relational words including each morpheme in the relational words corresponding to the query; and a second determination subunit, configured to determine the importance score of each morpheme in the query according to the number of times each morpheme appears and the total number of the relational words including each morpheme in the relational words corresponding to the query.

In one embodiment, when the historical query data is the historical data in the click log and the historical data includes a query-click term composed of a query and a click term corresponding to the query, the second determination unit includes:

a third count subunit, configured to respectively count the number of presentations and the number of clicks of a query-click term having common morphemes, and count the number of accumulative presentations and the number of accumulative clicks corresponding to each common morpheme; and a third determination subunit, configured to determine the number of presentations and the number of clicks corresponding to each morpheme in the query according to the number of accumulative presentations and the number of accumulative clicks corresponding to each common morpheme, and determine the importance score of each morpheme in the query according to the number of presentations and the number of clicks corresponding to each morpheme in the query.

In one embodiment, the morpheme self-explanation feature at least includes one of a morpheme proper noun type feature, a morpheme IDF feature, a morpheme word segmentation feature, a position feature of a morpheme in a query, and a global core score feature of a morpheme; and the morpheme cross feature at least includes one of a literal cross feature between a morpheme and another morpheme in a query of the morpheme, an average value feature of a morpheme transition probability in a query, a first transition probability feature of a morpheme and a second transition probability feature of the morpheme, a text classification related feature of a morpheme, a first cross feature between subject distribution of a morpheme and subject distribution of a query of the morpheme, and a PLSA subject similarity feature.

In one embodiment, when the preset feature includes the average value feature of a morpheme transition probability in a query in the morpheme cross feature, the first determination module 302 includes:

a first acquisition unit, configured to acquire transition probabilities between a morpheme in each piece of training data and other morphemes in a query of the morpheme in each piece of training data according to a transition probability dictionary; and a first determination unit, configured to determine an average value of the transition probabilities between a morpheme in each piece of training data and other morphemes in a query of the morpheme in each piece of training data, and determine the average value of the transition probabilities as a feature value of the average value feature of a morpheme transition probability in a query.

In one embodiment, when the preset feature includes the first transition probability feature of the morpheme and the second transition probability feature of the morpheme in the morpheme cross feature, the first determination module 302 includes:

a query unit, configured to query a transition probability dictionary for a probability value of a first transition probability of a morpheme in each piece of training data and a probability value of a second transition probability of the morpheme; and a second determination unit, configured to respectively determine the probability value of the first transition probability and the probability value of the second transition probability as feature values of the first transition probability feature of the morpheme and the second transition probability feature of the morpheme.

In one embodiment, the first determination module 302 further includes:

a first obtaining unit, configured to output queries included in a retrieval session in pairs, to obtain multiple query pairs, where each query pair obtained includes a first query and a second query;

a word segmentation unit, configured to segment first queries and second queries in all query pairs included in the retrieval session;

a combination unit, configured to combine each morpheme in the first queries with each morpheme in the second queries to obtain a morpheme pair, each morpheme pair including a first morpheme in the first queries and a second morpheme in the second queries;

a count unit, configured to count the number of times any morpheme pair appears in the retrieval session and the number of times the first morpheme and the second morpheme in the any morpheme pair separately appear;

a third determination unit, configured to determine a transition probability of the first morpheme relative to the second morpheme in the any morpheme pair according to the number of times any morpheme pair appears in the retrieval session and the number of times the second morpheme in the any morpheme pair separately appears, and determine a transition probability of the second morpheme relative to the first morpheme according to the number of times any morpheme pair appears in the retrieval session and the number of times the first morpheme in the any morpheme pair separately appears; and a second obtaining unit, configured to obtain the transition probability dictionary according to transition probabilities of first morphemes relative to second morphemes in all morpheme pairs and transition probabilities of the second morphemes relative to the first morphemes.

In one embodiment, when the preset feature includes the text classification related feature of a morpheme in the morpheme cross feature and the text classification related feature of a morpheme includes related features between morphemes and each morpheme category in a morpheme classification library, the first determination module 302 includes:

a second acquisition unit, configured to acquire a first preset number of morpheme categories in the morpheme classification library of the morpheme in each piece of training data; and a fourth determination unit, configured to determine a feature value of a related feature between the morpheme in each piece of training data and the first preset number of morpheme categories as a first feature value, and determine a feature value of a related feature between the morpheme in each piece of training data and other morpheme categories in the morpheme classification library except the first preset number of morpheme categories as a second feature value.

In one embodiment, when the text classification related feature of a morpheme further includes related features between the morphemes and each query category in a query classification library, the first determination module 302 further includes:

a third acquisition unit, configured to acquire a second preset number of query categories in the query classification library of the query of the morpheme in each piece of training data; and a fifth determination unit, configured to determine a feature value of a related feature between the morpheme in each piece of training data and the second preset number of query categories as a third feature value, and determine a feature value of a related feature between the morpheme in each piece of training data and other query categories in the query classification library except the second preset number of query categories as a fourth feature value.

In one embodiment, when the text classification related feature of a morpheme further includes the second cross feature between a morpheme category of a morpheme and a query category of a query of the morpheme, the first determination module 302 further includes:

a sixth determination unit, configured to determine each sub morpheme category under the first preset number of morpheme categories in the morpheme classification library of the morpheme in each piece of training data, and determine each sub query category under the second preset number of query categories in the query classification library of the query of the morpheme in each piece of training data;

a first construction unit, configured to construct a second cross feature with each sub morpheme category and each sub query category; and a seventh determination unit, configured to, when the sub morpheme category and the sub query category in any second cross feature are the same, determine a feature value of the any second cross feature as a fifth feature value, and when the sub morpheme category and the sub query category in any second cross feature are different, determine the feature value of the any second cross feature as a sixth feature value.

In one embodiment, when the preset feature includes the first cross feature between subject distribution of a morpheme and subject distribution of a query of the morpheme in the morpheme cross feature, the first determination module 302 includes:

a fourth acquisition unit, configured to acquire subject distribution of a third preset number of morphemes in a morpheme subject library of the morpheme in each piece of training data, and acquire subject distribution of a fourth preset number of queries in a query subject library of a query of the morpheme in each piece of training data;

an eighth determination unit, configured to determine subject distribution of each sub morpheme under subject distribution of the third preset number of morphemes in a morpheme subject library of the morpheme in each piece of training data, and determine subject distribution of each sub query under subject distribution of the fourth preset number of queries of the query of the morpheme in each piece of training data in the query subject library;

a second construction unit, configured to construct one first cross feature with subject distribution of each sub morpheme and subject distribution of each sub query; and a ninth determination unit, configured to, when subject distribution of the sub morpheme and subject distribution of the sub query in any first cross feature are the same, determine a feature value of the any first cross feature as a seventh feature value, or when subject distribution of the sub morpheme and subject distribution of the sub query in any first cross feature are different, determine a feature value of the any first cross feature as an eighth feature value.

In one embodiment, when the preset feature includes the PLSA subject similarity feature in the morpheme cross feature, the first determination module 302 includes:

a fifth acquisition unit, configured to acquire subject distribution of a third preset number of morphemes in a morpheme subject library of the morpheme in each piece of training data, and acquire subject distribution of a fourth preset number of queries in a query subject library of a query of the morpheme in each piece of training data;

a calculation unit, configured to calculate a subject similarity value between subject distribution of each morpheme and subject distribution of each query; and a tenth determination unit, configured to determine each subject similarity value obtained through calculation as a feature value of the PLSA subject similarity feature.

For the apparatus according to the embodiment of the present invention, when a model parameter is determined according to acquired training data, a morpheme importance analysis model is determined according to the determined model parameter, and further analysis of morpheme importance is achieved by using the morpheme importance analysis model, not only a computing speed becomes higher and efficiency of analyzing morpheme importance is improved, but also accuracy becomes higher.

Embodiment 4

Figure 4:
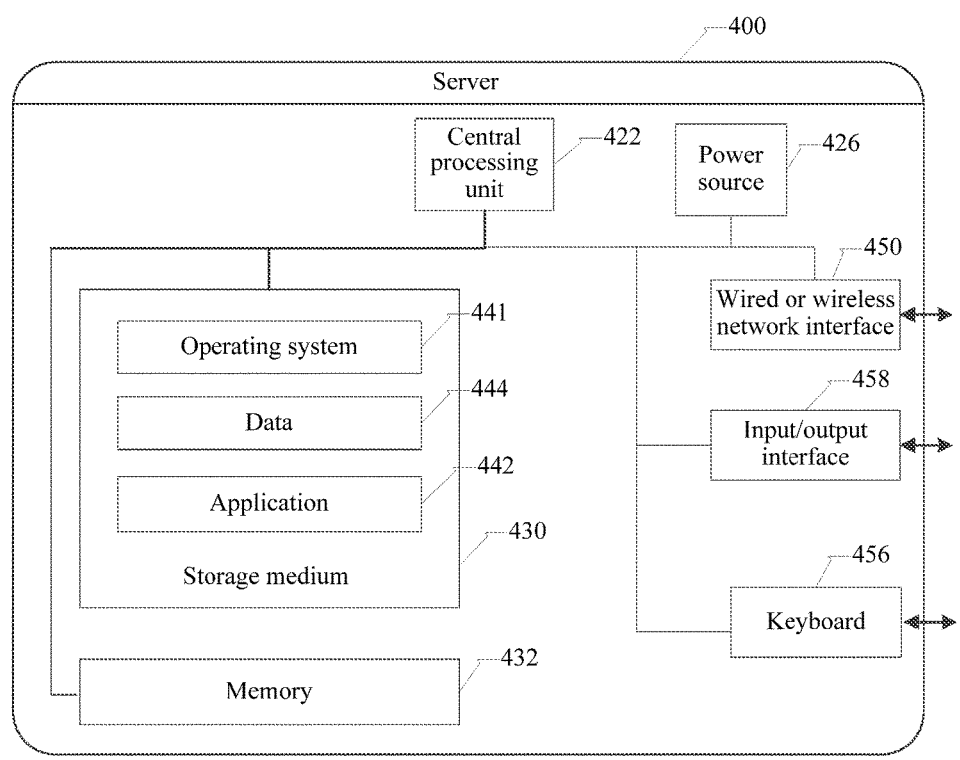
FIG. 4 is a schematic structural diagram of a server according to some embodiments of the present disclosure.

FIG. 4 is a schematic structural diagram of a computing device such as a server according to the embodiment of the present invention. The server can be configured to implement the method for determining a morpheme importance analysis model provided in the foregoing embodiment. The server 400 may vary significantly due to different configuration or performance, may include one or more central processing units (CPU) 422 (for example, one or more processors) and a memory 432, and one or more storage media 430 (for example, one or more mass storage devices) storing applications 442 or data 444. The memory 432 and the storage media 430 may be temporary storage or permanent storage. Programs stored in the storage media 430 may include one or more modules (not shown), and each module may include a series of instruction operations in the server. Further, the CPU 422 may be arranged to communicate with the storage media 430, and perform on the server 400 a series of instruction operations in the storage media 430.

The server 400 may further include one or more power sources 426, one or more wired or wireless network interfaces 450, one or more input/output interfaces 458, one or more keyboards 456, and/or, one or more operating systems 411, for example, Windows Server™, Mac OS X™, Unix™, Linux™, FreeBSD™, and the like.

Specifically, in this embodiment, for the memory 432 in the server and one or more programs, the one or more programs are stored in the storage media 430, and are configured to be performed by one or more processors. The one or more programs include instructions for performing the following operations:

acquiring at least two pieces of training data, each piece of training data including a query, any morpheme in the query, and an importance score of the any morpheme in the query;

determining a feature value of each preset feature of each piece of training data, the preset feature at least including one of a morpheme self-explanation feature and a morpheme cross feature; and determining a model parameter according to the feature value of each preset feature of all training data and importance scores of morphemes included in all training data, and determining the morpheme importance analysis model according to the determined model parameter, where the number of the model parameters depends on the number of the preset features, and the number of the model parameters is not greater than the number of pieces of the training data.

Suppose the above is a first possible implementation manner, in a second possible implementation manner provided on the basis of the first possible implementation manner, the memory of the terminal further includes an instruction for performing the following operations: the acquiring at least two pieces of training data including:

acquiring at least one query from historical query data, the historical query data being at least one piece of historical data in a retrieval log, a historical extension relation vocabulary, and a click log;

acquiring at least one morpheme in the query, and determining an importance score of each morpheme in the query; and determining the at least two pieces of training data according to the acquired query, morphemes in each query, and the importance scores of the morphemes in the query.

In a third possible implementation manner provided on the basis of the second possible implementation manner, the memory of the terminal further includes an instruction for performing the following operations: the historical query data being the historical data in the retrieval log; and the determining an importance score of each morpheme in the query including:

obtaining all morphemes in the query, and respectively counting the number of times each morpheme appears and the total number of times all morphemes in the query appear; and determining the importance score of each morpheme in the query according to the number of times each morpheme appears and the total number of times all morphemes in the query appear.

In a fourth possible implementation manner provided on the basis of the second possible implementation manner, the memory of the terminal further includes an instruction for performing the following operations: the historical query data being the historical data in the historical extension relation vocabulary, the historical data including a query and relational words corresponding to the query; and the determining an importance score of each morpheme in the query including:

obtaining all morphemes in the query, and respectively counting the number of times each morpheme appears and the total number of relational words including each morpheme in the relational words corresponding to the query; and determining the importance score of each morpheme in the query according to the number of times each morpheme appears and the total number of the relational words including each morpheme in the relational words corresponding to the query.

In a fifth possible implementation manner provided on the basis of the second possible implementation manner, the memory of the terminal further includes an instruction for performing the following operations: the historical query data being the historical data in the click log, the historical data including a query-clickterm composed of a query and a click term corresponding to the query; and the determining an importance score of each morpheme in the query including:

counting the number of presentations and the number of clicks of a query-clickterm having common morphemes, and counting the number of accumulative presentations and the number of accumulative clicks corresponding to each common morpheme; and determining the number of presentations and the number of clicks corresponding to each morpheme in the query according to the number of accumulative presentations and the number of accumulative clicks corresponding to each common morpheme, and determining the importance score of each morpheme in the query according to the number of presentations and the number of clicks corresponding to each morpheme in the query.

In a sixth possible implementation manner provided on the basis of any implementation manner of the first to fifth possible implementation manners, the memory of the terminal further includes an instruction for performing the following operations: the morpheme self-explanation feature at least including one of a morpheme proper noun type feature, a morpheme IDF feature, a morpheme word segmentation feature, a position feature of a morpheme in a query, and a global core score feature of a morpheme; and the morpheme cross feature at least including one of a literal cross feature between a morpheme and another morpheme in a query of the morpheme, an average value feature of a morpheme transition probability in a query, a first transition probability feature of a morpheme and a second transition probability feature of the morpheme, a text classification related feature of a morpheme, a first cross feature between subject distribution of a morpheme and subject distribution of a query of the morpheme, and a PLSA subject similarity feature.

In a seventh possible implementation manner provided on the basis of the sixth possible implementation manner, the memory of the terminal further includes an instruction for performing the following operations: when the preset feature includes the average value feature of a morpheme transition probability in a query in the morpheme cross feature, the determining a feature value of each preset feature of each piece of training data including:

acquiring transition probabilities between a morpheme in each piece of training data and other morphemes in a query of the morpheme in each piece of training data according to a transition probability dictionary; and determining an average value of the transition probabilities between a morpheme in each piece of training data and other morphemes in a query of the morpheme in each piece of training data, and determining the average value of the transition probabilities as a feature value of the average value feature of a morpheme transition probability in a query.

In an eighth possible implementation manner provided on the basis of the sixth possible implementation manner, the memory of the terminal further includes an instruction for performing the following operations: when the preset feature includes the first transition probability feature of the morpheme and the second transition probability feature of the morpheme in the morpheme cross feature, the determining a feature value of each preset feature of each piece of training data including:

querying a transition probability dictionary for a probability value of a first transition probability of a morpheme in each piece of training data and a probability value of a second transition probability feature of the morpheme, and respectively determining the probability value of the first transition probability and the probability value of the second transition probability as feature values of the first transition probability feature of the morpheme and the second transition probability feature of the morpheme.

In a ninth possible implementation manner provided on the basis of the seventh or eighth possible implementation manner, the memory of the terminal further includes an instruction for performing the following operations: the method further including:

outputting queries included in a retrieval session in pairs, to obtain multiple query pairs, where each query pair obtained includes a first query and a second query;

segmenting first queries and second queries in all query pairs included in the retrieval session, and combining each morpheme in the first queries with each morpheme in the second queries to obtain a morpheme pair, each morpheme pair including a first morpheme in the first queries and a second morpheme in the second queries;

counting the number of times any morpheme pair appears in the retrieval session and the number of times the first morpheme and the second morpheme in the any morpheme pair separately appear;

determining a transition probability of the first morpheme relative to the second morpheme in the any morpheme pair according to the number of times any morpheme pair appears in the retrieval session and the number of times the second morpheme in the any morpheme pair separately appears, and determining a transition probability of the second morpheme relative to the first morpheme according to the number of times any morpheme pair appears in the retrieval session and the number of times the first morpheme in the any morpheme pair separately appears; and obtaining the transition probability dictionary according to transition probabilities of first morphemes relative to second morphemes in all morpheme pairs and transition probabilities of the second morphemes relative to the first morphemes.

In a tenth possible implementation manner provided on the basis of the sixth possible implementation manner, the memory of the terminal further includes an instruction for performing the following operations: when the preset feature includes the text classification related feature of a morpheme in the morpheme cross feature and the text classification related feature of a morpheme includes related features between morphemes and each morpheme category in a morpheme classification library, the determining a feature value of each preset feature of each piece of training data including:

acquiring a first preset number of morpheme categories in the morpheme classification library of the morpheme in each piece of training data, determining a feature value of a related feature between the morpheme in each piece of training data and the first preset number of morpheme categories as a first feature value, and determining a feature value of a related feature between the morpheme in each piece of training data and other morpheme categories in the morpheme classification library except the first preset number of morpheme categories as a second feature value.

In an eleventh possible implementation manner provided on the basis of the tenth possible implementation manner, the memory of the terminal further includes an instruction for performing the following operations: when the text classification related feature of a morpheme further includes related features between the morpheme and each query category in a query classification library, the determining a feature value of each preset feature of each piece of training data further including:

acquiring a second preset number of query categories in the query classification library of the query of the morpheme in each piece of training data, determining a feature value of a related feature between the morpheme in each piece of training data and the second preset number of query categories as a third feature value, and determining a feature value of a related feature between the morpheme in each piece of training data and other query categories in the query classification library except the second preset number of query categories as a fourth feature value.

In a twelfth possible implementation manner provided on the basis of the eleventh possible implementation manner, the memory of the terminal further includes an instruction for performing the following operations: when the text classification related feature of a morpheme further includes a second cross feature between a morpheme category of a morpheme and a query category of a query of the morpheme, the determining a feature value of each preset feature of each piece of training data further including:

determining each sub morpheme category under the first preset number of morpheme categories in the morpheme classification library of the morphemes in each piece of training data, and determining each sub query category under the second preset number of query categories in the query classification library of the query of the morphemes in each piece of training data; and constructing a second cross feature with each sub morpheme category and each sub query category, and if the sub morpheme category and the sub query category in any second cross feature are the same, determining a feature value of the any second cross feature as a fifth feature value, or if the sub morpheme category and the sub query category in any second cross feature are different, determining a feature value of the any second cross feature as a sixth feature value.

In a thirteenth possible implementation manner provided on the basis of the sixth possible implementation manner, the memory of the terminal further includes an instruction for performing the following operations: when the preset feature includes the first cross feature between subject distribution of a morpheme and subject distribution of a query of the morpheme in the morpheme cross feature, the determining a feature value of each preset feature of each piece of training data including:

acquiring subject distribution of a third preset number of morphemes in a morpheme subject library of the morpheme in each piece of training data, and acquiring subject distribution of a fourth preset number of queries of the query of the morphemes in each piece of training data in a query subject library;

determining subject distribution of each sub morpheme under subject distribution of the third preset number of morphemes in a morpheme subject library of the morpheme in each piece of training data, and determining subject distribution of each sub query under subject distribution of the fourth preset number of queries of the query of the morphemes in each piece of training data in the query subject library; and constructing one first cross feature with subject distribution of each sub morpheme and subject distribution of each sub query, and if subject distribution of the sub morpheme and subject distribution of the sub query in any first cross feature are the same, determining a feature value of the any first cross feature as a seventh feature value, or if subject distribution of the sub morpheme and subject distribution of the sub query in the any first cross feature are different, determining the feature value of the any first cross feature as an eighth feature value.

In a fourteenth possible implementation manner provided on the basis of the sixth possible implementation manner, the memory of the terminal further includes an instruction for performing the following operations: when the preset feature includes the PLSA subject similarity feature in the morpheme cross feature, the determining a feature value of each preset feature of each piece of training data including:

acquiring subject distribution of a third preset number of morphemes in a morpheme subject library of the morpheme in each piece of training data, and acquiring subject distribution of a fourth preset number of queries of the query of the morphemes in each piece of training data in a query subject library; and calculating a subject similarity value between subject distribution of each morpheme and subject distribution of each query, and determining each subject similarity value obtained through calculation as a feature value of the PLSA subject similarity feature.

For the server according to the embodiment of the present invention, when a model parameter is determined according to acquired training data, a morpheme importance analysis model is determined according to the determined model parameter, and further analysis of morpheme importance is achieved by using the morpheme importance analysis model, not only a computing speed becomes higher and efficiency of analyzing morpheme importance is improved, but also accuracy becomes higher.

It should be noted that, when the apparatus for determining a morpheme importance analysis model provided in the foregoing embodiment determines a morpheme importance analysis model, only division of each functional module is used as an example for description. In a practical application, the foregoing functions may be allocated to and implemented by different functional modules, that is, an internal structure of the apparatus is divided into different functional modules, so as to accomplish all or some of the functions described above. In addition, the apparatus for determining a morpheme importance analysis model provided in the foregoing embodiment and the method embodiments for determining a morpheme importance analysis model belong to the same concept; please refer to the method embodiment for a specific implementation process thereof, which is not repeated herein.

The sequence numbers of the foregoing embodiments of the present invention are merely for convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present invention. Any modification, equivalent replacement, or improvement made within the spirit and principle of the present invention shall fall within the protection scope of the present invention.

What is claimed is:

1. A method for determining a morpheme importance analysis model, the method comprising:
at a computing device having one or more processors and memory storing programs executed by the one or more processors;
acquiring a plurality of pieces of text training data from historical query data, comprising:
acquiring at least one text query from the historical query data, the historical query data being at least one piece of the historical data in a retrieval log, a historical extension relation vocabulary, and a click log;
acquiring at least one morpheme in the text query, and determining an importance score of each morpheme in the text query; and
determining the plurality of pieces of the text training data according to the acquired text query, morphemes in each text query, and the importance scores of the morphemes in the text query;
determining morpheme feature values of preset morpheme features of each piece of the text training data, the morpheme preset features at least comprising one of a morpheme self-explanation feature and a morpheme cross feature; and
obtaining a model parameter according to the morpheme feature values of the preset morpheme features of the plurality of pieces of the text training data and the importance scores of morphemes comprised in the plurality of pieces of the text training data, and determining a morpheme importance analysis model according to the model parameter, wherein the morpheme importance analysis model is expressed with a formula as:

$$p(Y=1|x) = \pi(x) = \frac{1}{1+e^{-g(x)}}$$

wherein $g(x)=\beta_0+\beta_1 x_1+\beta_2 x_2+ \ldots +\beta_p x_p$, $x_1, x_2 \ldots x_p$ are variables corresponding to each preset morpheme feature, and $\beta_0, \beta_1 \ldots \beta_p$ are the model parameter;

wherein the number of the model parameters depends on the number of the preset features, and the number of the model parameters is not greater than the number of the plurality of pieces of the text training data; and wherein the morpheme importance analysis model places emphasis on the morpheme having a higher importance score, and therefore improves a searching accuracy and a searching efficiency of a search engine.

2. The method according to claim 1, wherein the historical query data is the historical data in the retrieval log; and the obtaining the importance score of the morpheme in the text query comprises:
obtaining all morphemes in the text query, and respectively counting the number of times each morpheme appears and the total number of times all morphemes in the text query appear; and
determining the importance score of each morpheme in the text query according to the number of times each morpheme appears and the total number of times all morphemes in the text query appear.

3. The method according to claim 1, wherein the historical query data is the historical data in the historical extension relation vocabulary, the historical data comprising the text query and relational words corresponding to the text query; and the obtaining the importance score of the morpheme in the text query comprises:
obtaining all morphemes in the text query, and respectively counting the number of times each morpheme appears and the total number of relational words comprising each morpheme in the relational words corresponding to the text query; and
determining the importance score of the morpheme in the text query according to the number of times each morpheme appears and the total number of the relational words comprising each morpheme in the relational words corresponding to the text query.

4. The method according to claim 1, wherein the historical query data is the historical data in the click log, the historical data comprising a query-clickterm composed of the text query and a click term corresponding to the text query; and the obtaining the importance score of the morpheme in the text query comprises:
counting the number of presentations and the number of clicks of the query-clickterm having common morphemes, and counting the number of accumulative presentations and the number of accumulative clicks corresponding to each common morpheme; and
determining the number of presentations and the number of clicks corresponding to each morpheme in the text query according to the number of accumulative presentations and the number of accumulative clicks corresponding to each common morpheme, and determining the importance score of the morpheme in the text query according to the number of presentations and the number of clicks corresponding to each morpheme in the text query.

5. The method according to claim 1, wherein the morpheme self-explanation feature at least comprises one of a morpheme proper noun type feature, a morpheme inverse document frequency (IDF) feature, a morpheme word segmentation feature, a position feature of a morpheme in the text query, and a global core score feature of a morpheme; and the morpheme cross feature at least comprises one of a literal cross feature between a morpheme and another morpheme in the text query of the morpheme, an average value feature of a morpheme transition probability in the text query, a first transition probability feature of a morpheme and a second transition probability feature of the morpheme, a text classification related feature of a morpheme, a first cross feature between subject distribution of a morpheme and subject distribution of the text query of the morpheme, and a probabilistic latent semantic analysis (PLSA) subject similarity feature.

6. The method according to claim 5, wherein, when the preset feature comprises an average value feature of a morpheme transition probability in the text query in the morpheme cross feature, the determining the feature values of the preset features of each piece of the text training data comprises:

acquiring transition probabilities between the morpheme in each piece of the text training data and other morphemes in the text query of the morpheme in each piece of the text training data according to a transition probability dictionary; and
determining an average value of the transition probabilities between the morpheme in each piece of the text training data and other morphemes in the text query of the morpheme in each piece of the text training data, and determining the average value of the transition probabilities as a feature value of the average value feature of the morpheme transition probability in the text query.

7. The method according to claim 5, wherein, when the preset feature comprises a first transition probability feature of a morpheme and a second transition probability feature of the morpheme in the morpheme cross feature, the determining a feature value of each preset feature of each piece of the text training data comprises:

querying a transition probability dictionary for a probability value of a first transition probability of the morpheme in each piece of the text training data and a probability value of a second transition probability of the morpheme, and respectively determining the probability value of the first transition probability and the probability value of the second transition probability as feature values of the first transition probability feature of the morpheme and the second transition probability feature of the morpheme.

8. The method according to claim 6, wherein the method further comprises:

outputting queries comprised in a retrieval session in pairs, to obtain multiple query pairs, wherein each query pair obtained comprises a first text query and a second text query;
segmenting first text queries and second text queries in all query pairs comprised in the retrieval session, and combining each morpheme in the first text queries with each morpheme in the second text queries to obtain a morpheme pair, each morpheme pair comprising a first morpheme in the first text queries and a second morpheme in the second queries;

counting the number of times any morpheme pair appears in the retrieval session and the number of times the first morpheme and the second morpheme in the any morpheme pair separately appear;

determining a transition probability of the first morpheme relative to the second morpheme in the any morpheme pair according to the number of times any morpheme pair appears in the retrieval session and the number of times the second morpheme in the any morpheme pair separately appears, and determining a transition probability of the second morpheme relative to the first morpheme according to the number of times any morpheme pair appears in the retrieval session and the number of times the first morpheme in the any morpheme pair separately appears; and obtaining the transition probability dictionary according to transition probabilities of first morphemes relative to second morphemes in all morpheme pairs and transition probabilities of the second morphemes relative to the first morphemes.

9. The method according to claim 5, wherein, when the preset feature comprises the text classification related feature of a morpheme in the morpheme cross feature and the text classification related feature of a morpheme comprises related features between morphemes and each morpheme category in a morpheme classification library, the determining a feature value of each preset feature of each piece of the text training data comprises:

acquiring a first preset number of morpheme categories in the morpheme classification library of the morpheme in each piece of the text training data, determining a feature value of a related feature between the morpheme in each piece of the text training data and the first preset number of morpheme categories as a first feature value, and determining a feature value of a related feature between the morpheme in each piece of the text training data and other morpheme categories in the morpheme classification library except the first preset number of morpheme categories as a second feature value.

10. The method according to claim 9, wherein, when the text classification related feature of a morpheme further comprises related features between the morphemes and each query category in a query classification library, the determining a feature value of each preset feature of each piece of the text training data further comprises:

acquiring a second preset number of query categories in the query classification library of the text query of the morpheme in each piece of the text training data, determining a feature value of a related feature between the morpheme in each piece of the text training data and the second preset number of query categories as a third feature value, and determining a feature value of a related feature between the morpheme in each piece of the text training data and other query categories in the query classification library except the second preset number of query categories as a fourth feature value.

11. The method according to claim 10, wherein, when the text classification related feature of a morpheme further comprises a second cross feature between a morpheme category of a morpheme and a query category of the text query of the morpheme, the determining the feature values of the preset features of each piece of the text training data further comprises:

determining each sub morpheme category under the first preset number of morpheme categories in the morpheme classification library of the morpheme in each piece of the text training data, and determining each sub query category under the second preset number of query categories in the query classification library of the text query of the morpheme in each piece of the text training data; and constructing a second cross feature with each sub morpheme category and each sub query category, and if the sub morpheme category and the sub query category in any second cross feature are the same, determining a feature value of the any second cross feature as a fifth feature value, or if the sub morpheme category and the sub query category in any second cross feature are different, determining a feature value of the any second cross feature as a sixth feature value.

12. The method according to claim 5, wherein, when the preset feature comprises the first cross feature between subject distribution of a morpheme and subject distribution of the text query of the morpheme in the morpheme cross feature, the determining the feature values of the preset features of each piece of the text training data comprises:

acquiring subject distribution of a third preset number of morphemes in a morpheme subject library of the morpheme in each piece of the text training data, and acquiring subject distribution of a fourth preset number of queries in a query subject library of the text query of the morpheme in each piece of the text training data;

determining subject distribution of each sub morpheme under subject distribution of the third preset number of morphemes in a morpheme subject library of the morpheme in each piece of the text training data, and determining subject distribution of each sub query under subject distribution of the fourth preset number of queries in the query subject library of the text query of the morpheme in each piece of the text training data; and constructing one first cross feature with subject distribution of each sub morpheme and subject distribution of each sub query, and if subject distribution of the sub morpheme and subject distribution of the sub query in any first cross feature are the same, determining a feature value of the any first cross feature as a seventh feature value, or if subject distribution of the sub morpheme and subject distribution of the sub query in any first cross feature are different, determining a feature value of the any first cross feature as an eighth feature value.

13. The method according to claim 5, wherein, when the preset feature comprises the PLSA subject similarity feature in the morpheme cross feature, the determining a feature value of each preset feature of each piece of the text training data comprises:

acquiring subject distribution of a third preset number of morphemes in a morpheme subject library of the morpheme in each piece of the text training data, and acquiring subject distribution of a fourth preset number of queries in a query subject library of the text query of the morpheme in each piece of the text training data; and calculating a subject similarity value between subject distribution of each morpheme and subject distribution of each text query, and determining each subject similarity value obtained through calculation as a feature value of the PLSA subject similarity feature.

14. An apparatus for determining a morpheme importance analysis model, comprising a plurality of program modules comprising computer-implemented instructions stored in memory of a computing device and executed by one or more processors of a computing device, the plurality program modules comprising:
an acquisition module, configured to acquire a plurality of pieces of text training data from historical query data, comprising:
acquiring at least one text query from the historical query data, the historical query data being at least one piece of the historical data in a retrieval log, a historical extension relation vocabulary, and a click log;
acquiring at least one morpheme in the text query, and determining an importance score of each morpheme in the text query; and
determining the plurality of pieces of the text training data according to the acquired text query, morphemes in each text query, and the importance scores of the morphemes in the text query;
a first determination module, configured to determine morpheme feature values of preset morpheme features of each piece of the text training data, the preset morpheme feature at least comprising one of a morpheme self-explanation feature and a morpheme cross feature;
a second determination module, configured to obtain a model parameter according to the morpheme feature values of the preset morpheme features of the plurality of pieces of the text training data and importance scores of morphemes comprised in the plurality of pieces of the text training data, wherein the number of the model parameters depends on the number of the preset features, and the number of the model parameters is not greater than the number of the plurality of pieces of the text training data; and wherein obtaining the model parameter comprises: plugging the importance score of the morpheme in the plurality of pieces of the text training data and the feature values of the preset features of each piece of the text training data; and
a third determination module, configured to determine a morpheme importance analysis model according to the model parameter, wherein the morpheme importance analysis model is expressed with a formula as:

$$p(Y=1|x) = \pi(x) = \frac{1}{1+e^{-g(x)}}$$

wherein $g(x)=\beta_0+\beta_1 x_1+\beta_2 x_2+ \ldots +\beta_p x_p$, $x_1, x_2 \ldots x_p$ are variables corresponding to each preset morpheme feature, and $\beta_0, \beta_1 \ldots \beta_p$ are the model parameter,
such that the morpheme importance analysis model places emphasis on the morpheme having a higher importance score, and therefore improves a searching accuracy and a searching efficiency of a search engine.

15. The apparatus according to claim 14, wherein, when the historical query data is the historical data in the retrieval log, the second determination unit comprises:
a first obtaining subunit, configured to obtain all morphemes in the text query;
a first count subunit, configured to respectively count the number of times each morpheme appears and the total number of times all morphemes in the text query appear; and
a first determination subunit, configured to determine the importance score of each morpheme in the text query according to the number of times each morpheme appears and the total number of times all morphemes in the text query appear.

16. The apparatus according to claim 14, wherein, when the historical query data is the historical data in the historical extension relation vocabulary, and the historical data comprising the text query and relational words corresponding to the text query, the second determination unit comprises:
a second obtaining subunit, configured to obtain all morphemes in the text query;
a second count subunit, configured to respectively count the number of times each morpheme appears and the total number of relational words comprising each morpheme in the relational words corresponding to the text query; and
a second determination subunit, configured to determine the importance score of each morpheme in the text query according to the number of times each morpheme appears and the total number of the relational words comprising each morpheme in the relational words corresponding to the text query.

17. The apparatus according to claim 14, wherein, when the historical query data is the historical data in the click log and the historical data comprises a query-clickterm composed of the text query and a click term corresponding to the text query, the second determination unit comprises:
a third count subunit, configured to respectively count the number of presentations and the number of clicks of a query-clickterm having common morphemes, and count the number of accumulative presentations and the number of accumulative clicks corresponding to each common morpheme; and
a third determination subunit, configured to determine the number of presentations and the number of clicks corresponding to each morpheme in the text query according to the number of accumulative presentations and the number of accumulative clicks corresponding to each common morpheme, and determine the importance score of each morpheme in the text query according to the number of presentations and the number of clicks corresponding to each morpheme in the text query.

18. The apparatus according to claim 14, wherein the morpheme self-explanation feature at least comprises one of a morpheme proper noun type feature, a morpheme inverse document frequency (IDF) feature, a morpheme word segmentation feature, a position feature of a morpheme in the text query, and a global core score feature of a morpheme; and
the morpheme cross feature at least comprises one of a literal cross feature between a morpheme and another morpheme in the text query of the morpheme, an average value feature of a morpheme transition probability in the text query, a first transition probability feature of a morpheme and a second transition probability feature of the morpheme, a text classification related feature of a morpheme, a first cross feature between subject distribution of a morpheme and subject distribution of the text query of the morpheme, and a probabilistic latent semantic analysis (PLSA) subject similarity feature.

19. The apparatus according to claim 18, wherein, when the preset feature comprises the average value feature of a morpheme transition probability in the text query in the morpheme cross feature, the first determination module comprises:
- a first acquisition unit, configured to acquire transition probabilities between a morpheme in each piece of the text training data and other morphemes in the text query of the morpheme in each piece of the text training data according to a transition probability dictionary; and
- a first determination unit, configured to determine an average value of the transition probabilities between a morpheme in each piece of the text training data and other morphemes in the text query of the morpheme in each piece of the text training data, and determine the average value of the transition probabilities as a feature value of the average value feature of a morpheme transition probability in the text query.

20. The apparatus according to claim 18, wherein, when the preset feature comprises the first transition probability feature of a morpheme and a second transition probability feature of the morpheme in the morpheme cross feature, the first determination module comprises:
- a query unit, configured to query a transition probability dictionary for a probability value of a first transition probability of a morpheme in each piece of the text training data and a probability value of a second transition probability of the morpheme; and
- a second determination unit, configured to respectively determine the probability value of the first transition probability and the probability value of the second transition probability as feature values of the first transition probability feature of the morpheme and the second transition probability feature of the morpheme.

21. The apparatus according to claim 19, wherein the first determination module further comprises:
- a first obtaining unit, configured to output queries comprised in a retrieval session in pairs, to obtain multiple query pairs, wherein each query pair obtained comprises a first text query and a second text query;
- a word segmentation unit, configured to segment first text queries and second text queries in all query pairs comprised in the retrieval session;
- a combination unit, configured to combine each morpheme in the first text queries with each morpheme in the second text queries to obtain a morpheme pair, each morpheme pair comprising a first morpheme in the first queries and a second morpheme in the second queries;
- a count unit, configured to count the number of times any morpheme pair appears in the retrieval session and the number of times the first morpheme and the second morpheme in the any morpheme pair separately appear;
- a third determination unit, configured to determine a transition probability of the first morpheme relative to the second morpheme in the any morpheme pair according to the number of times any morpheme pair appears in the retrieval session and the number of times the second morpheme in the any morpheme pair separately appears, and determine a transition probability of the second morpheme relative to the first morpheme according to the number of times any morpheme pair appears in the retrieval session and the number of times the first morpheme in the any morpheme pair separately appears; and
- a second obtaining unit, configured to obtain the transition probability dictionary according to transition probabilities of first morphemes relative to second morphemes in all morpheme pairs and transition probabilities of the second morphemes relative to the first morphemes.

22. The apparatus according to claim 18, wherein, when the preset feature comprises the text classification related feature of a morpheme in the morpheme cross feature and the text classification related feature of a morpheme comprises related features between morphemes and each morpheme category in a morpheme classification library, the first determination module comprises:
- a second acquisition unit, configured to acquire a first preset number of morpheme categories in the morpheme classification library of the morpheme in each piece of the text training data; and
- a fourth determination unit, configured to determine a feature value of a related feature between the morpheme in each piece of the text training data and the first preset number of morpheme categories as a first feature value, and determine a feature value of a related feature between the morpheme in each piece of the text training data and other morpheme categories in the morpheme classification library except the first preset number of morpheme categories as a second feature value.

23. The apparatus according to claim 22, wherein, when the text classification related feature of a morpheme further comprises related features between the morphemes and each query category in a query classification library, the first determination module further comprises:
- a third acquisition unit, configured to acquire a second preset number of query categories in the query classification library of the text query of the morpheme in each piece of the text training data; and
- a fifth determination unit, configured to determine a feature value of a related feature between the morpheme in each piece of the text training data and the second preset number of query categories as a third feature value, and determine a feature value of a related feature between the morpheme in each piece of the text training data and other query categories in the query classification library except the second preset number of query categories as a fourth feature value.

24. The apparatus according to claim 23, wherein, when the text classification related feature of a morpheme further comprises a second cross feature between a morpheme category of a morpheme and a query category of the text query of the morpheme, the first determination module further comprises:
- a sixth determination unit, configured to determine each sub morpheme category under the first preset number of morpheme categories in the morpheme classification library of the morpheme in each piece of the text training data, and determine each sub query category under the second preset number of query categories in the query classification library of the text query of the morpheme in each piece of the text training data;
- a first construction unit, configured to construct a second cross feature with each sub morpheme category and each sub query category; and
- a seventh determination unit, configured to, when the sub morpheme category and the sub query category in any second cross feature are the same, determine a feature value of the any second cross feature as a fifth feature value, and when the sub morpheme category and the sub query category in any second cross feature are different, determine the feature value of the any second cross feature as a sixth feature value.

25. The apparatus according to claim 18, wherein, when the preset feature comprises the first cross feature between subject distribution of a morpheme and subject distribution of the text query of the morpheme in the morpheme cross feature, the first determination module comprises:
- a fourth acquisition unit, configured to acquire subject distribution of a third preset number of morphemes in a morpheme subject library of the morpheme in each piece of the text training data, and acquire subject distribution of a fourth preset number of queries in a query subject library of the text query of the morpheme in each piece of the text training data;
- an eighth determination unit, configured to determine subject distribution of each sub morpheme under subject distribution of the third preset number of morphemes in a morpheme subject library of the morpheme in each piece of the text training data, and determine subject distribution of each sub query under subject distribution of the fourth preset number of queries in the query subject library of the text query of the morpheme in each piece of the text training data;
- a second construction unit, configured to construct one first cross feature with subject distribution of each sub morpheme and subject distribution of each sub query; and
- a ninth determination unit, configured to, when subject distribution of the sub morpheme and subject distribution of the sub query in any first cross feature are the same, determine a feature value of the any first cross feature as a seventh feature value, and when subject distribution of the sub morpheme and subject distribution of the sub query in any first cross feature are different, determine the feature value of the any first cross feature as an eighth feature value.

26. The apparatus according to claim 18, wherein, when the preset feature comprises the PLSA subject similarity feature in the morpheme cross feature, the first determination module comprises:
- a fifth acquisition unit, configured to acquire subject distribution of a third preset number of morphemes in a morpheme subject library of the morpheme in each piece of the text training data, and acquire subject distribution of a fourth preset number of queries in a query subject library of the text query of the morpheme in each piece of the text training data;
- a calculation unit, configured to calculate a subject similarity value between subject distribution of each morpheme and subject distribution of each text query; and
- a tenth determination unit, configured to determine each subject similarity value obtained through calculation as a feature value of the PLSA subject similarity feature.

* * * * *